United States Patent
Mallesan et al.

(10) Patent No.: US 10,848,911 B1
(45) Date of Patent: Nov. 24, 2020

(54) SYSTEMS AND METHODS FOR TRACKING A LOCATION OF A MOBILE DEVICE

(71) Applicant: Verizon Patent and Licensing Inc., Arlington, VA (US)

(72) Inventors: Saravanan Mallesan, Fairfax, VA (US); Ashish Sardesai, Ashburn, VA (US); Paritosh Tyagi, Boyds, MD (US); Gina L. Otts, Flower Mound, TX (US); Jean M. McManus, Bedford, NH (US); Corbin Pierce Moline, Irving, TX (US); Sumanth S. Mallya, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/663,162

(22) Filed: Oct. 24, 2019

(51) Int. Cl.
*H04W 24/00* (2009.01)
*H04W 4/02* (2018.01)
*H04W 4/33* (2018.01)
*H04W 4/029* (2018.01)

(52) U.S. Cl.
CPC .......... *H04W 4/025* (2013.01); *H04W 4/029* (2018.02); *H04W 4/33* (2018.02)

(58) Field of Classification Search
CPC ....... H04W 4/029; H04W 4/33; H04W 4/025; H04W 24/00
See application file for complete search history.

(56) References Cited

U.S. PATENT DOCUMENTS

| 9,612,114 | B2 * | 4/2017 | Wachter | G01C 5/06 |
| 2012/0265373 | A1 * | 10/2012 | Ingvalson | G01C 21/20 701/4 |
| 2015/0247917 | A1 * | 9/2015 | Gum | G01S 5/0263 342/452 |
| 2015/0341765 | A1 * | 11/2015 | Macias | H04W 4/90 455/404.2 |
| 2016/0047648 | A1 * | 2/2016 | Edge | H04W 4/025 455/73 |

(Continued)

OTHER PUBLICATIONS

Falcon et al., "Predicting Floor Level for 911 Calls With Neural Networks and Smart Phone Sensor Data," International Conference on Learning Representations (ICLR) 2018.

(Continued)

*Primary Examiner* — Dai Phuong

(57) ABSTRACT

A device determines, based on location verification data that has been received, that the device is indoors at a first geographic location. The device determines a base measured barometric pressure, and an initial floor that the device is located on in a structure that includes the first geographic location. The device determines an adjusted measured barometric pressure for a second geographic location based on a second measured barometric pressure for the second geographic location and one or more reference barometric pressures that are associated with a reference location. The device determines an altitude for the second geographic location based on the base measured barometric pressure and the adjusted measured barometric pressures. The device causes a server to predict a floor that the device is located on at the second geographic location and to provide floor data that identifies the floor to an interface that is accessible to the device.

20 Claims, 9 Drawing Sheets

(56) References Cited

U.S. PATENT DOCUMENTS

2016/0102995 A1* 4/2016 Gum ................... G01C 5/06
                                                                         702/98
2017/0219342 A1* 8/2017 Morioka ............... G01C 5/06

OTHER PUBLICATIONS

Muralidharan et al., "Barometric Phone Sensors: More Hype Than Hope!," HotMobile '14: Proceedings of the 15th Workshop on Mobile Computing Systems and Applications, Santa Barbara, CA, Feb. 26-27, 2014.

* cited by examiner

SYSTEMS AND METHODS FOR TRACKING A LOCATION OF A MOBILE DEVICE

BACKGROUND

A mobile device may include one or sensors and/or applications that are used to determine a geographic location. For example, the mobile device may determine a geographic location using a global positioning system (GPS) or a similar type of technology. In some cases, the mobile device may include a barometric pressure sensor that may be used to determine a barometric pressure of the geographic location. In these cases, the barometric pressure may be used to determine an altitude of the mobile device (e.g., relative to a known position, such as ground level, sea level, and/or the like).

DETAILED DESCRIPTION OF PREFERRED EMBODIMENTS

Figure 1A:
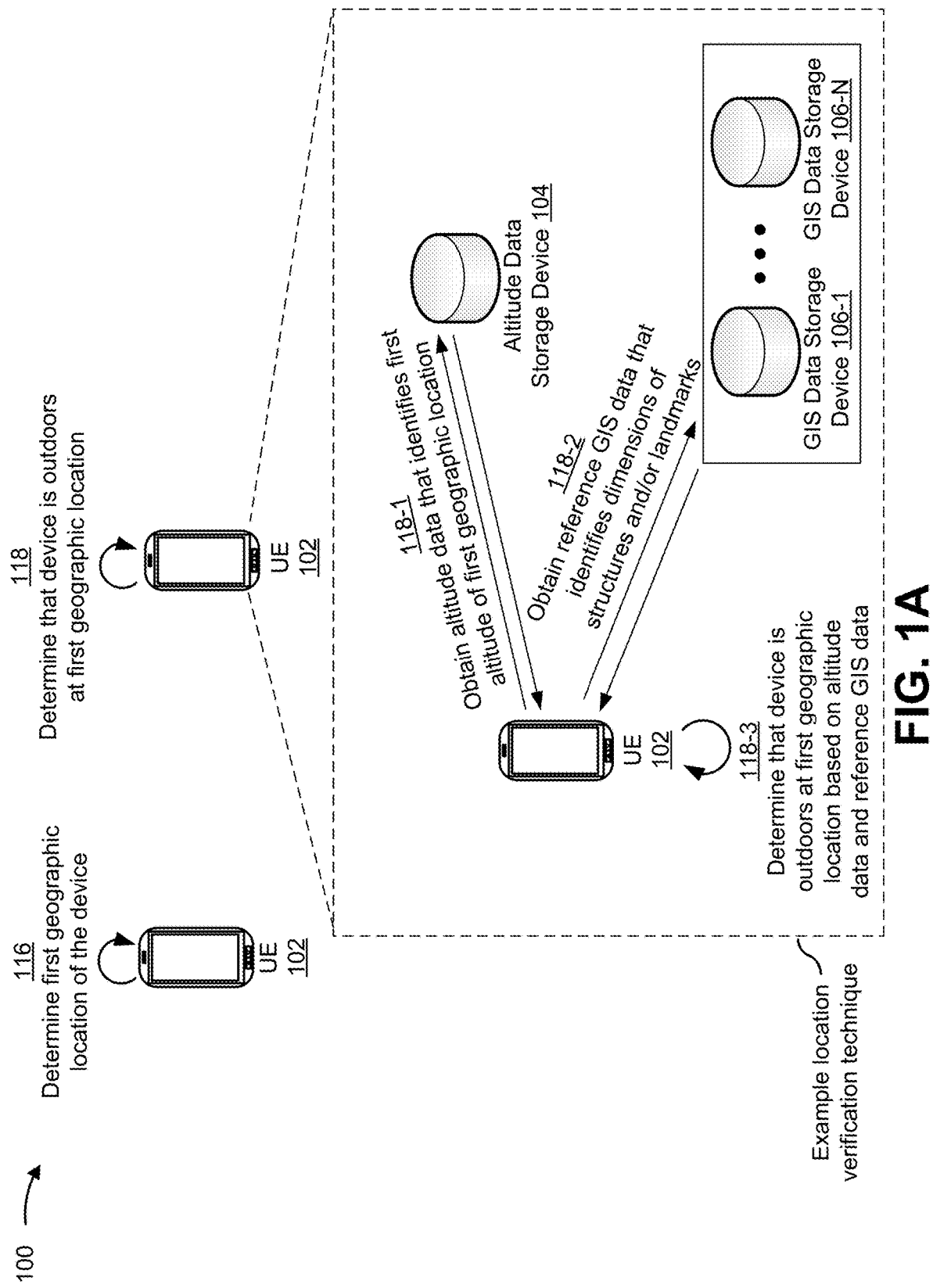
FIGS. 1A-1F are diagrams of one or more example implementations described herein.

The following detailed description of example implementations refers to the accompanying drawings. The same reference numbers in different drawings may identify the same or similar elements.

A mobile device may use a barometric pressure sensor to determine a barometric pressure for a geographic location and may use the barometric pressure to determine an altitude at that geographic location. However, the barometric pressure sensor will have a bias or a skew that prevents a determined barometric pressure from being able to be used to determine an absolute altitude. For example, while the determined barometric pressure may be accurate to a certain degree, even a small bias or skew in the determined barometric pressure will cause a large bias or skew when determining the altitude of the mobile device. Additional factors can also cause a bias or skew when the mobile device is determining barometric pressure, such as changes in weather over time, factors that affect a temperature inside of a building (e.g., a temperature controlled by a heating, ventilation, and air conditioning (HVAC) system of the building), and/or the like. Consequently, when the mobile device determines the altitude at that geographic location, the altitude may be within a threshold distance of an absolute altitude but will not identify the absolute altitude.

Furthermore, without the absolute altitude, the mobile device may be unable to perform one or more useful functions that require an accurate altitude measurement. For example, a mobile device may be used to assist an initial first responder in performing a rescue operation on a particular floor within a building. In this example, the initial first responder may be tasked with entering the building and assisting individuals that may be trapped on the particular floor of the building. Without the absolute altitude, the mobile device may be unable to accurately identify and report the particular floor that the mobile device is located on inside of the building. Without being able to determine the correct floor, one or more other first responders (e.g., a first responder operating a ladder of a fire truck) may be unable to effectively assist the initial first responder in a rescue operation.

Moreover, some techniques rely on beacon-based triangulation or electromagnetic fingerprinting. However, the beacon-based triangulation technique may require outfitting each building with ultra-wide band (UWB) beacons or may require deploying a beacon infrastructure throughout a geographic region (e.g., a city, a county, a state, and/or the like). Additionally, the electromagnetic fingerprinting technique may require extensive surveying within each building (e.g., in order to create any necessary fingerprints) and may require repeat fingerprinting when new individuals become subject to the fingerprinting.

According to some implementations described herein, a mobile device determines an adjusted measured barometric pressure at particular geographic location inside of a structure and uses the adjusted measured barometric pressure to identify a floor that the mobile device is located on at the particular geographic location within the structure. For example, the mobile device may receive location verification data (defined further herein) associated with a first geographic location and may process the location verification data to determine that the mobile device is indoors at the first geographic location.

Additionally, the mobile device may determine a base measured barometric pressure at the first geographic location and an adjusted measured barometric pressure at a second geographic location. The adjusted measured barometric pressure may be a measured barometric pressure that has been adjusted to account for a bias or a skew of a barometric pressure sensor of the mobile device (e.g., at a particular time period, over a period of time, and/or the like), to account for changes in weather in a vicinity of the mobile device, to account for a temperature difference between a temperature inside of the structure and a temperature outside of the structure (e.g., a difference that may occur based on an HVAC system of the structure), and/or the like. Next, the mobile device may determine, based on the base measured barometric pressure and the adjusted measured barometric pressure, an altitude at the second geographic location. Additionally, the mobile device may provide, to a location tracking platform, reporting data that includes location data that identifies the second geographic location, barometric pressure data (e.g., that identifies the base measured barometric pressure, the adjusted measured barometric pressure, and/or the like), altitude data that identifies the altitude at the second geographic location, and/or the like. This may allow the location tracking platform to use one or more clustering techniques to predict a floor that the device is located on at the second geographic location and to provide floor data that identifies the floor to an interface that is accessible to the mobile device.

In this way, the mobile device uses the adjusted measured barometric pressure to identify the floor that the mobile device is located on at particular geographic locations while inside of the structure. By using a difference between the first and second reference barometric pressures to determine the adjusted measured barometric pressure, the mobile device is able to determine altitude in a manner that reduces or eliminates any inaccuracies that might otherwise be caused by changes to weather conditions and/or other factors. In some cases, the mobile device may determine a pressure difference between a measured barometric pressure outside of the structure and a measured barometric pressure inside of the structure, and may use the pressure difference when determining the adjusted measured barometric pressure. In these cases, the mobile device determines the adjusted measured barometric pressure in a manner that accounts for temperature differences between temperature inside and outside of the structure, such as a temperature difference that may occur based on an HVAC system of the structure.

Furthermore, in some cases, the mobile device may take a first order derivative of a function that measure barometric pressure over time and may use the first order derivative to determine a new base measured barometric pressure. By determining the altitude with the new base measured barometric pressure (and with the adjusted measured barometric pressure), the mobile device determines the altitude in a manner that accounts for a bias or skew that the barometric pressure sensor of the mobile device may incur while moving throughout the structure.

Additionally, by using crowd sourced data (e.g., reporting data from the mobile device and other reporting data from other mobile devices inside of the structure), the mobile device identifies the correct floor that the mobile device is located on within the structure. Moreover, based on one or more points stated above, the mobile device conserves resources (e.g., processing resources, network resources, memory resources, and/or the like) that would be wasted determining inaccurate barometric pressures (e.g., that are not adjusted in a manner described herein), conserves resources that would be wasted determining inaccurate altitudes (e.g., that are not determined based on adjusted measured barometric pressures described herein), conserves resources that would be wasted determining inaccurate floors, conserves resources of the mobile device and/or one or more other devices that would be wasted performing one or more actions based on inaccurate data, and/or the like.

FIGS. 1A-1F are diagrams of one or more example implementations 100 described herein. Example implementation(s) 100 may include a user equipment (UE) 102, an altitude data storage device 104, a group of geographic information system (GIS) data storage devices 106 (shown as GIS data storage device 106-1 through GIS data storage device 106-N), a reference structure 108 (e.g., a weather station), a location tracking platform 110, an active user data storage device 112, and a first responder management device 114.

As shown in FIGS. 1A-1F, UE 102 may determine an adjusted measured barometric pressure at a particular location inside of a structure, may use the adjusted measured barometric pressure to determine an altitude of UE 102 at the particular location, and may use the altitude to identify a floor that UE 102 is located on within the structure. One or more implementations described herein are performed by UE 102. In practice, any number of the one or more implementations that are described as being performed by UE 102 may be performed by location tracking platform 110. Similarly, one or more implementations that are described as being performed by location tracking platform 110 may be performed by UE 102.

As shown in FIG. 1A, and by reference numbers 116, UE 102 (sometimes referred to as the device) may determine a first geographic location of the device. For example, UE 102 may have access to a location management application that can be used to provide a set of location-based services that include a first service for periodically determining geographic locations of the device. In this case, UE 102 (e.g., using the location management application) may use a global positioning system (GPS) technology and/or a similar type of technology to determine a first geographic location of the device.

The location management application that may be used to track movements of UE 102, regardless of whether UE 102 is outdoors, indoors, in motion along a ground level, in motion in a direction perpendicular to the ground level (e.g., changing floors in a building), and/or the like. The set of location-based services may include the first service for periodically determining geographic locations of UE 102, a second service for determining whether UE 102 is outdoors or indoors at a given geographic location, a third service for determining an adjusted measured barometric pressure at a given geographic location, a fourth service for determining an altitude of UE 102 at a given geographic location, a fifth service for determining a floor that UE 102 is located on at a given geographic location inside of a structure, and/or the like.

In some implementations, UE 102 (e.g., using the location management application) may provide one or more location-based services based on a request from a user. For example, a user may launch the location management application and may interact with one or more user interface features to submit a request for a particular location-based service. Additionally, or alternatively, UE 102 (e.g., using the location management application) may provide one or more location-based services based on one or more other types of triggers. For example, UE 102 may be configured to begin using the location management application to provide one or more location-based services based on detecting that UE 102 is in motion. In this case, a motion sensor of UE 102, such as an accelerometer, may periodically measure a speed of UE 102. This may allow UE 102 to periodically compare the speed of UE 102 with a threshold speed and may, based on a particular speed satisfying the threshold speed, cause UE 102 to use the location management application to provide one or more location-based services.

As shown by reference number 118, UE 102 may determine that the device is outdoors at the first geographic location. For example, UE 102 may use a discovery mode of the location management application to determine whether the device is outdoors and/or indoors. The discovery mode of the location management application may be activated based on receiving a request from a user, based on another trigger (described above) being satisfied, based on UE 102 determining a particular geographic location, and/or the like.

In some implementations, UE 102 (e.g., while the discovery mode is active) may perform a set of location verification techniques to determine whether the device is indoors or outdoors. For example, if UE 102 does not know whether the device is indoors or outdoors, UE 102 may perform a first group of location verification techniques (defined below) to determine whether the device is indoors or outdoors. If UE 102 has determined that the device is outdoors, UE 102 may perform a second group of location verification techniques to determine whether the device has moved from an outdoor location to an indoor location, as will be further explained in connection with FIG. 1B.

The first group of location verification techniques may include a first location verification technique to verify whether UE 102 is outdoors at the first geographic location based on reference GIS data that identifies dimensions of a set of structures and/or landmarks in a particular geographic region, a second location verification technique to verify whether UE 102 is outdoors at the first geographic location based on reference location data and/or reference altitude data (e.g., of other UEs 102 actively reporting data near UE 102), a third location verification to verify whether UE 102 is outdoors at the first geographic location based on speed data, and/or the like.

In some implementations, and as shown by reference numbers 118-1 to 118-3, UE 102 may use the first location verification technique to determine that the device is outdoors at the first geographic location. For example, and as shown by reference number 118-1, UE 102 may obtain altitude data that identifies a first altitude for the first geographic location. In this case, UE 102 may provide, to altitude data storage device 104, a request for altitude data that identifies a first altitude for the first geographic location. The request may include location data that identifies the first geographic location. UE 102 may use a first communication interface, such as a first application programming interface (API) or another type of communication interface, to provide the request. This may cause altitude data storage device 104 to provide UE 102 with a response (e.g., via the first communication interface) that includes the altitude data. The first altitude may represent a measured altitude and/or a known altitude for the first geographic location.

As shown by reference number 118-2, UE 102 may obtain reference GIS data that identifies dimensions of structures and/or landmarks in a geographic region. For example, UE 102 may provide, to the group of GIS data storage devices 106, a request for reference GIS data. The reference GIS data may include data that identifies dimensions of a structure, a landmark, a road, and/or the like. The dimensions may be identified by using geographic coordinates and altitudes to define a polygon or a polyhedron that represents an area of a structure, a landmark, a road, and/or the like. The request may include the location data that identifies the first geographic location. UE 102 may use a second communication interface, such as a second API or another type of communication interface, to provide the request. This may cause the group of GIS data storage devices 106 to provide UE 102 with a response (e.g., via the second communication interface) that includes the reference GIS data.

As shown by reference number 118-3, UE 102 may determine that the device is outdoors at the first geographic location based on the altitude data and the reference GIS data. For example, UE 102 may compare the location data that identifies the first geographic location and the altitude data with the GIS data to determine that the first geographic location is within a boundary of an entity that is known to be outside (e.g., a road, a park, a landmark, and/or the like), to determine that the first geographic location is not within an boundary of an entity that is comprised of indoor space (e.g., a house, an office building, and/or the like), and/or the like.

In some implementations, UE 102 may, while performing the first location verification technique, determine that the device is outdoors at the first geographic location based on whether the location data and the altitude data satisfy a threshold level of confidence when compared to particular GIS data that identifies boundaries of an entity that is known to be outside. In some cases, the threshold level of confidence may be a configured value. In other cases, the threshold level of confidence may be determined by a first data model that has been trained on historical data using machine learning. For example, the first data model may be trained on historical location data, historical altitude data, and/or historical reference GIS data, such that the first data model is able to set threshold levels of confidence for different entities, based on trends associated with past UEs 102 that have traveled at or near the first geographic location of UE 102.

Additionally, or alternatively, and provided as another example, UE 102 may determine that the device is outdoors at the first geographic location based on reference location data and/or reference altitude data reported by one or more other UEs 102. For example, active user data storage device 112 (see FIG. 1F) (or another device) may use a data structure to store reference location data and/or reference altitude data for one or more other UEs 102 that are actively reporting data. The data structure may associate the reference location data and the reference altitude data with particular reference GIS data, with reference floor data that identifies floors that the one or more other UEs 102 are located on, and/or the like. In this case, UE 102 may use a third communication interface (e.g., a third API) to provide active user data storage device 112 with a request for reference location data, reference altitude data, particular reference GIS data, reference floor data, and/or the like, for one or more other UEs 102 that are in a vicinity of UE 102. Additionally, UE 102 may determine that the device is outdoors at the first geographic location based on the received data reported by the one or more other UEs 102 (sometimes collectively referred to herein as reporting data).

Additionally, or alternatively, UE 102 may determine that the device is outdoors at a particular geographic location based on speed data that identifies a speed of UE 102. For example, if UE 102 is traveling a speed that is indicative of UE 102 being in a vehicle, UE 102 may determine that the vehicle is driving down a road and therefore is outdoors at the particular geographic location.

In this way, UE 102 determines that UE 102 is outdoors at the first geographic location.

Figure 1B:
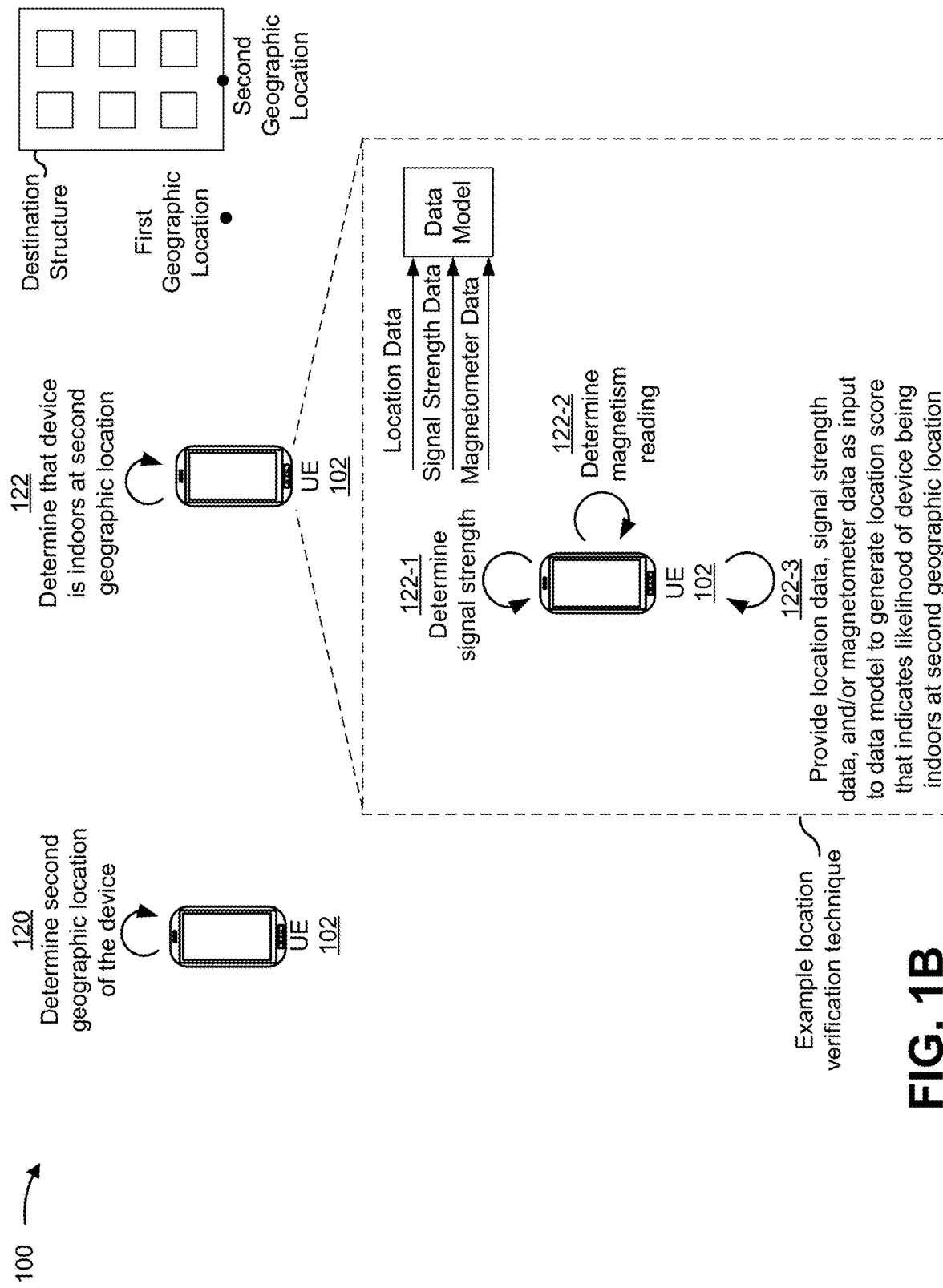

As shown in FIG. 1B, and by reference number 120, UE 102 may determine a second geographic location of the device. For example, UE 102 (e.g., using the GPS technology and/or the similar technology) may determine the second geographic location of the device.

As shown by reference number 122, UE 102 may determine that the device is indoors at the second geographic location. For example, UE 102 may use the location management application to determine that the device is indoors at the second geographic location. In some cases, UE 102 may determine that the device has changed location from an outdoor location (e.g., the first geographic location) to an indoor location (e.g., the second geographic location). In these cases, the second geographic location may represent a location at or near an entrance point of a structure (shown in FIG. 1C as a destination structure). In other cases, UE 102 may determine that the device is located at an indoor location (e.g., without previously determining that the device is located at an outdoor location).

In some implementations, UE 102 may use the second group of location verification techniques to determine that the device is indoors at the second geographic location. The second group of location verification techniques may include the first, second, and/or third location verification techniques included in the first group of location verification techniques, a fourth location verification technique to predict (e.g., using machine learning) whether UE 102 is indoors at a given geographic location, a fifth location verification technique to determine whether UE 102 is indoors at a given geographic location based on wireless access point data, a sixth location verification technique to determine whether UE 102 is indoors at a given geographic location based on light sensor data, a seventh location verification technique to determine whether UE 102 is indoors at a given geographic location based on magnetometer data, and/or the like.

In some implementations, UE 102 may use the first location verification technique (described in connection with FIG. 1A) to determine that the device is indoors at the second geographic location. For example, UE 102 may determine that the device is indoors at the second geographic location based on the location data that identifies the second geographic location, altitude data that identifies a second altitude at the second geographic location, and the reference GIS data that identifies the dimensions of the set of structures and/or landmarks in a geographic region associated with UE 102. As a specific example, UE 102 may determine that the device is indoors at the second geographic location based on the second geographic location and the second altitude being within a boundary of a building that is known to be comprised of indoor space.

Additionally, or alternatively, UE 102 may use the second location verification technique (described in connection with FIG. 1A) to determine that the device is indoors at the second geographic location. For example, UE 102 may to determine that the device is indoors at the second geographic location based on reporting data provided by one or more other UEs 102 (the reference location data, the reference altitude data, the reference floor data, and/or the like) that are in a vicinity (or a threshold vicinity) of UE 102.

Additionally, or alternatively, UE 102 may use the fourth location verification technique to predict whether the device is indoors at the second geographic location. For example, UE 102 may have access to a second data model that has been trained using machine learning to predict whether the device is indoors at a given geographic location. The second data model may, for example, be a neural network, such as an artificial neural network (ANN), an artificial recurrent neural network (RNN), such as an RNN that utilizes a long short-term memory (LSTM) architecture, and/or the like.

To train the second data model, a training device (e.g., location tracking platform 110 and/or another device) may have used one or more machine learning techniques to process historical location verification data. The historical location verification data may include historical location data that identifies geographic locations of other UEs 102, historical signal strength data that identifies signal strengths of other UEs 102 at particular geographic locations, historical magnetometer data that identifies magnetism readings at particular geographic locations, historical light data that identifies levels of ambient light at particular geographic locations, and/or the like. The one or more machine learning techniques may include classification-based techniques, regression-based techniques, clustering-based techniques, and/or the like. The second data model may have been trained to predict whether the device is indoors at a given geographic location by continuously processing the historical location verification data, by identifying trends within the historical location verification data, and/or by adjusting weights (e.g., weights of a neural network) to further improve accuracy of predictions made by the second data model. Additionally, UE 102 may be configured with the second data model and/or provided with access to the second data model (e.g., via another communication interface).

Reference numbers 122-1 to 122-3 show UE 102 utilizing the second data model. For example, and as shown by reference number 122-1, UE 102 may first determine a signal strength of the device at the second geographic location. In this case, UE 102 may determine a signal strength (e.g., a radio signal strength) at the second geographic location by obtaining a received signal strength indicator (RSSI) value. The RSSI value may represent an estimated measure of power level that UE 102 is receiving from an access point device (e.g., a router and/or a similar device) and/or from a device associated with a cellular network.

As shown by reference number 122-2, UE 102 may determine a magnetism reading at the second geographic location. For example, UE 102 may be configured with a magnetometer sensor and may use the magnetometer sensor to generate magnetometer data that identifies a magnetism reading at the second geographic location.

As shown by reference number 122-3, UE 102 may then provide the location data that identifies the second geographic location, the signal strength data, and/or the magnetometer data as input to the second data model to cause the second data model to output a location score that indicates a likelihood of the device being indoors at the second geographic location. Additionally, UE 102 may determine that the device is indoors at the second geographic location based on the location score (e.g., based on the location score satisfying a threshold location score).

Additionally, or alternatively, UE 102 may use the fifth location verification technique to determine that the device is indoors at the second geographic location. For example, UE 102 may obtain wireless access point data that identifies that UE 102 has connected to a wireless network and/or that identifies boundaries of the wireless network of a structure. If the wireless access point data identifies that UE 102 has connected to the wireless network, UE 102 may determine that the device is indoors at the second geographic location. If the wireless access point data identifies boundaries of the wireless network, UE 102 may compare the wireless access point data with the location data that identifies the second geographic location to determine whether the second geographic location is part of the wireless network (which may indicate that UE 102 is indoors at the second geographic location). The wireless access point data may be obtained via a fourth communication interface (e.g., a fourth API).

Additionally, or alternatively, UE 102 may use the sixth location verification technique to determine that the device is indoors at the second geographic location. For example, UE 102 (e.g., using a light sensor) may have obtained light sensor data that identifies a first ambient light reading at the first geographic location and may obtain additional light sensor data that identifies a second ambient light reading at the second geographic location. In this case, UE 102 may compare the light sensor data for the first geographic location with the additional light sensor data for the second geographic location and may determine that the device is indoors at the second geographic location based on a difference between the light sensor data and the additional light sensor data.

In other cases, if ambient light measured by UE 102 is artificial, the measured ambient light may be indicative of UE 102 being indoors, without UE 102 having to compared the measured ambient light to previously measured ambient light. For example, UE 102 may be able to obtain light sensor data for a particular geographic location and may be able to identify that measured ambient light at the particular geographic location is artificial, without comparing the light sensor data to previously measured light sensor data.

Additionally, or alternatively, UE 102 may use the seventh location verification technique to determine that the device is indoors at the second geographic location. For example, if UE 102 enters a building with a metallic skeletal structure, magnetism readings made by a magnetometer sensor of UE 102 may produce higher magnetism readings than previously performed magnetism readings that were made while UE 102 is outdoors. As a specific example, UE 102 (e.g., using a magnetometer sensor) may have obtained magnetometer data that identifies a first magnetism reading at the first geographic location (while UE 102 is outdoors) and may obtain additional magnetometer data that identifies a second magnetism reading at the second geographic location (while UE 102 is indoors). In this example, UE 102 may compare the magnetometer data for the first geographic location with the additional magnetometer data for the second geographic location and may determine that the device is indoors at the second geographic location based on a difference between the magnetometer data and the additional magnetometer data.

In some implementations, the set of location verification techniques may include authoritative location verification techniques and/or non-authoritative location verification techniques. If an authoritative location verification technique outputs a value that indicates that the device is indoors at a given geographic location, UE 102 may use the location management application to provide one or more other location-based services (e.g., such as those described in FIGS. 1C-1F). If two or more non-authoritative location verification techniques output values that indicate that the device is indoors at a given geographic location, UE 102 may use the location management application to provide one or more other location-based services (e.g., such as those described in FIGS. 1C-1F). The authoritative location verification techniques may include the first location verification technique, the fourth location verification technique, the fifth location verification technique, and/or the like. The non-authoritative location verification techniques may include the second location verification technique, the third location verification technique, the sixth location verification technique, the seventh location verification technique, and/or the like.

While one or more implementations above are described as being performed in connection with the second geographic location, it is to be understood that UE 102 may be configured to periodically determine geographic locations of the device. Consequently, the one or more implementations described as being performed in connection with the second geographic location may be performed in connection with each geographic location determined by UE 102, or in connection with a subset of geographic locations determined by UE 102.

In some implementations, UE 102 may cause new reference GIS data to be stored by the group of GIS data storage devices 106. For example, by determining a first time period that UE 102 is at the first geographic location, which is outdoors, and by determining a second time period (e.g., one second later, five seconds later, one minute later, and/or the like) that UE 102 is at the second geographic location, which is indoors, UE 102 is able to identify that the second geographic location is at or near an entrance point of the structure. Consequently, UE 102 (e.g., using the location management application) may provide new reference GIS data that identifies the entrance point to the group of GIS data storage devices 106.

In this way, UE 102 determines that the device is indoors at the second geographic location.

Figure 1C:
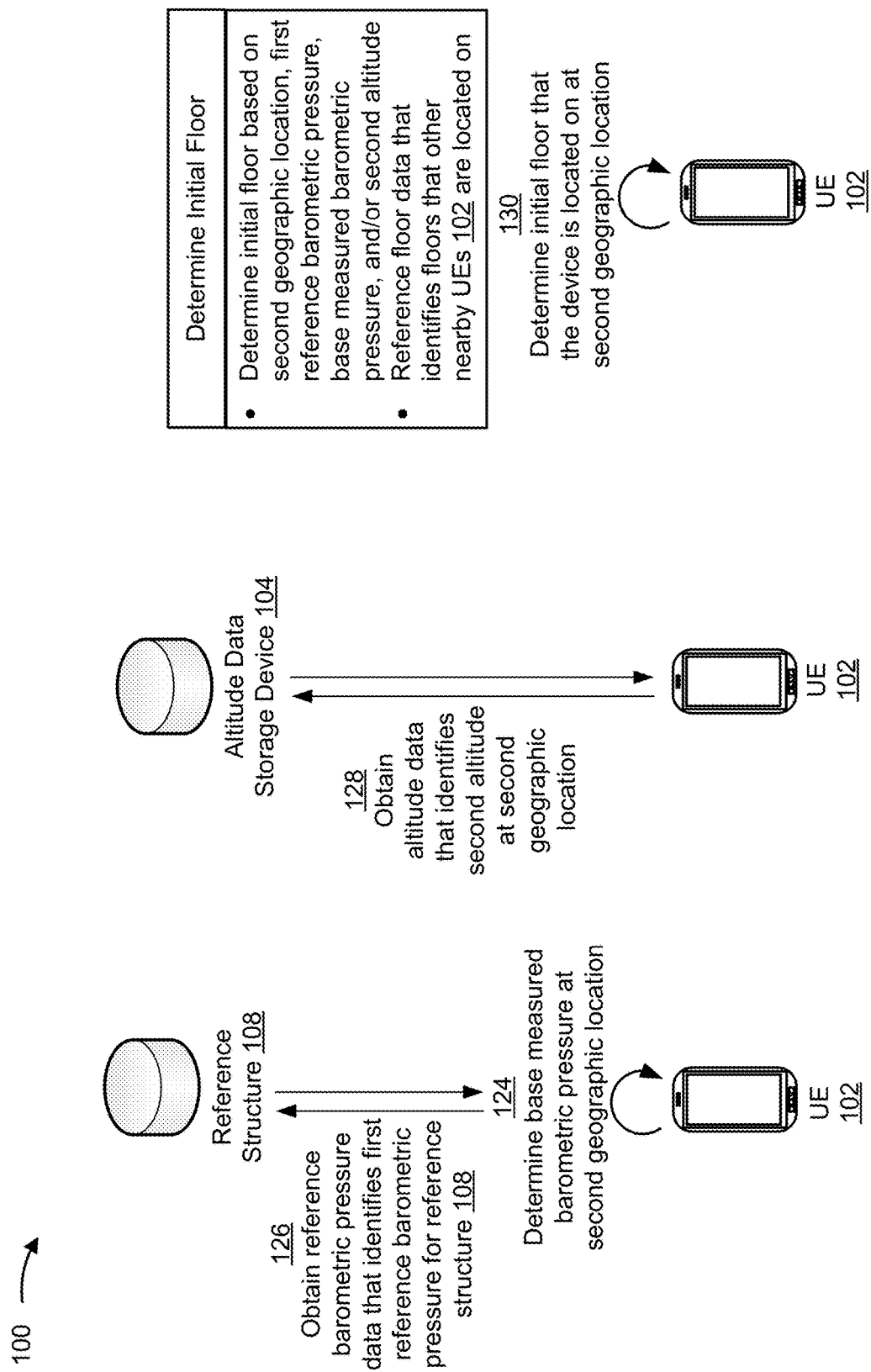

As shown in FIG. 1C, and by reference number 124, UE 102 may determine a base measured barometric pressure at the second geographic location. For example, UE 102 may include a barometric pressure sensor that allows the device to determine measured barometric pressures at particular geographic locations. In this case, UE 102 (e.g., using the location management application) may cause the barometric pressure sensor to determine a first measured barometric pressure at the second geographic location and may select the first measured barometric pressure as the base measured barometric pressure (e.g., based on determining that UE 102 is inside at the second geographic location).

In some cases, UE 102 may have been configured to determine measured barometric pressures at each determined geographic location (e.g., including geographic locations that are outdoors, such as the first geographic location). In these cases, UE 102 may have multiple measured barometric pressures (e.g., a measured barometric pressure at the first geographic location, while UE 102 is outdoors, and a measured barometric pressure at the second geographic location, while UE 102 is indoors), and may select, as the base measured barometric pressure, a particular measured barometric pressure that corresponds to the second geographic location. The base measured barometric pressure will be used when determining adjusted measured barometric pressures while UE 102 is inside of the structure, as will be explained further herein.

As shown by reference number 126, UE 102 may obtain reference barometric pressure data that identifies a first reference barometric pressure for reference structure 108. For example, changes in weather will cause changes in barometric pressure. To account for these changes, UE 102 may periodically obtain reference barometric pressures at reference structure 108 (e.g., UE 102 may obtain a reference barometric pressure after each determined geographic location). To obtain reference barometric pressure data that identifies the first reference barometric pressure, UE 102 may, via a fifth communication interface (e.g., a fifth API), submit a request for the first reference barometric pressure to a device associated with reference structure 108. This may cause the device associated with reference structure 108 to use the fifth communication interface to provide UE 102 with a response that includes the first reference barometric pressure.

As shown by reference number 128, UE 102 may obtain altitude data that identifies a second altitude of the second geographic location. For example, to be able to determine an initial floor that the device is located on at the second geographic location, UE 102 may first need to determine a second altitude at the second geographic location. In some implementations, UE 102 may use the first communication interface (e.g., the first API) to obtain, from altitude data storage device 104, altitude data that identifies the second altitude of the second geographic location. The second altitude may represent a measured altitude and/or a known altitude for the second geographic location.

Additionally, or alternatively, UE 102 may use the second communication interface (e.g., the second API) to obtain, from the group of GIS data storage devices 106, the altitude data that identifies the second altitude of the second geographic location. In some cases, the altitude data may have been reported by other UEs 102 that had previously determined the altitude data while located at or near the second geographic location. Additionally, or alternatively, UE 102 may use a hypsometric equation and/or a first order derivative of a function of a set of measured barometric pressures to determine the second altitude, as will be further explained in connection with FIG. 1D.

As shown by reference number 130, UE 102 may determine an initial floor that the device is located on at the second geographic location. For example, UE 102 may determine an initial floor of the structure that the device is located on based on the second geographic location, the first reference barometric pressure, the base measured barometric pressure, and/or the second altitude. In this case, UE 102 may use a sixth communication interface (e.g., a sixth API) to provide, to location tracking platform 110, determined locations, barometric pressures, and/or altitudes. This may cause location tracking platform 110 to use the received information to determine the initial floor and to provide UE 102 (e.g., via the sixth communication interface) with floor data that identifies the initial floor that UE 102 is located on at the second geographic location. Additional information regarding how location tracking platform 110 determines a particular floor that UE 102 is located on may be found in FIG. 1E.

Additionally, or alternatively, UE 102 may determine the initial floor based on reference floor data that identifies floors that other nearby UEs 102 are located on. For example, if UE 102 had not previously collected any location data indicating that UE 102 is located outdoors, and UE was determined to be located inside the structure at a first determined geographic location, then UE 102 may not have sufficient data to identify an initial floor that the device is located on in the structure. In this case, UE 102 may obtain the reference location data, the reference altitude data, the reference floor data, and/or the like, for the one or more other UEs 102 are in a vicinity of UE 102. UE 102 may use the third communication interface (e.g., the third API) to obtain the reference floor data and/or the reference location data from active user data storage device 112. This may allow UE 102 to, for example, compare the reference location data with the location data that identifies the second geographic location and the altitude data that identifies the second altitude with the reference altitude data, and to determine the initial floor based on the comparison (e.g., based on identifying another UE 102 that has the same or a similar geographic location and altitude).

In this way, UE 102 determines the initial floor that the device is located on at the second geographic location.

Figure 1D:
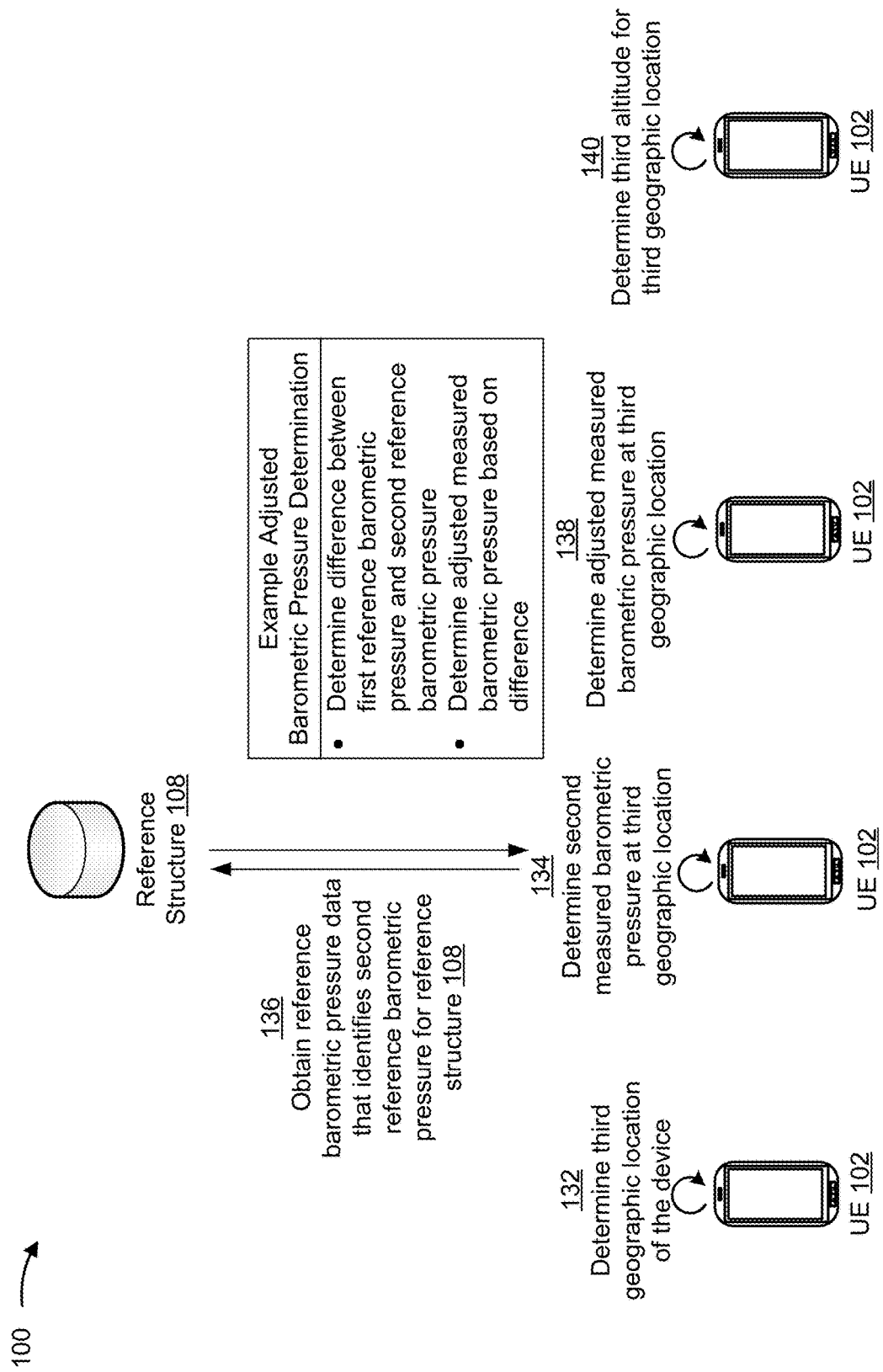

As shown in FIG. 1D, and by reference number 132, UE 102 may determine a third geographic location of the device. For example, UE 102 may determine a third geographic location of the device in a manner described above (e.g., using the GPS technology or similar technology).

As shown by reference number 134, UE 102 may determine a second measured barometric pressure at the third geographic location. For example, UE 102 may use the barometric pressure sensor to determine the second measured barometric pressure at the third geographic location. However, numerous factors can affect barometric pressure determined by UE 102, such as changes in weather over time, sensor bias or skew of the barometric pressure sensor, a temperature difference between a temperature inside of the structure and a temperature outside of the structure (e.g., a difference that may occur based on a heating, ventilation, and air conditioning (HVAC) system of the structure), and/or the like. Consequently, UE 102 may need to adjust the second measured barometric pressure (e.g., based on reference barometric pressures) to determine an accurate barometric pressure reading, as will be shown below.

As shown by reference number 136, UE 102 may obtain reference barometric pressure data that identifies a second reference barometric pressure for reference structure 108. For example, UE 102 may obtain reference barometric pressure data that identifies a second reference barometric pressure in a manner described in connection with FIG. 1C.

As shown by reference number 138, UE 102 may determine an adjusted measured barometric pressure at the third geographic location. For example, as UE 102 moves around inside of the structure, weather changes may occur (e.g., changes in temperature) that cause changes in barometric pressure. While it would be useful to have UE 102 re-measure barometric pressure at the second geographic location, UE 102 is no longer located at the second geographic location and thus is unable to perform this measurement. Instead, UE 102 may determine a difference between the first reference barometric pressure (measured at or near a time at which UE 102 was at the second geographic location) and the second reference barometric pressure (measured at or near a time at which UE 102 is at the third geographic location). Additionally, UE 102 may determine the adjusted measured barometric pressure by adjusting the second measured barometric pressure by an amount that represents the difference between the first reference barometric pressure and the second reference barometric pressure.

As shown by reference number 140, UE 102 may determine a third altitude for the third geographic location. For example, UE 102 may determine a third altitude for the third geographic location based on the base measured barometric pressure and the adjusted measured barometric pressure.

In some implementations, UE 102 may determine the third altitude by using the base measured barometric pressure and the adjusted measured barometric pressure to determine a change in altitude from the second altitude that had been determined for the second geographic location. By determining the third altitude using the base measured barometric pressure and the adjusted measured barometric pressure, UE 102 may determine the third altitude in a manner that accounts for weather-induced barometric pressure changes that may have occurred since UE 102 was at the second geographic location.

In some implementations, UE 102 may determine the third altitude by using a hypsometric function to process the base measured barometric and the adjusted measured barometric pressure. For example, UE 102 may determine the third altitude by executing the following hypsometric function:

$$H(p0, p1) = \left(\left(\frac{p1}{p0}\right)^{(1/5.25579)} - 1\right) * (T + 273.15)/0.0065$$

In the hypsometric function shown above, H(p0, p1) represents a height H (i.e., an altitude) that is based on a base barometric pressure p0 and a current barometric pressure p1 (e.g., a particular measured barometric pressure). Specifically, $$\left(\frac{p1}{p0}\right)$$

represents a ratio between the base barometric pressure p0 and the current barometric pressure p1, where the constant 5.25579 represents a gravitational acceleration, where T represents a temperature taken at a present time period (e.g., a time at or shortly after UE 102 determines a particular geographic location), where the constant 273.15 represents a conversion metric (e.g., to convert T, which may be in Celsius, to Kelvin), and where the constant 0.0065 represents a lapse rate (e.g., a rate at which temperature may change based on an altitude change, where temperature and altitude are inversely proportional). In this way, UE 102 accounts for an impact that temperature has on atmospheric density when determining the third altitude for the third geographic location.

In some implementations, UE 102 may periodically determine one or more other geographic locations, one or more other measured barometric pressures, one or more other adjusted measured barometric pressures, and one or more other altitudes. For example, UE 102 may be configured to determine these values at set time periods and/or at set time intervals (e.g., while UE 102 is moving around inside of the structure).

In some implementations, as described above, UE 102 may use the hypsometric function to determine an altitude (e.g., the third altitude, a particular altitude that corresponds to another geographic location of the device, and/or the like). For example, if reference barometric pressure data is available, UE 102 may be configured to use the hypsometric function to determine the altitude.

In some implementations, UE 102 may determine the altitude by taking a first order derivative of a function that represents measured barometric pressures over time. For example, UE 102 may select, as a reference barometric pressure, a first measured barometric pressure at a geographic location of UE 102, at a time at which UE 102 is determined to be moving in a horizontal direction. In this case, UE 102 may determine that the device is moving in a horizontal direction by taking a first order derivative of a function that represents measured barometric pressures over time. Once UE 102 stops moving (e.g., which may also be determined using the first order derivative of the function), UE 102 may select a second measured barometric pressure (e.g., associated with a current geographic location). The selected barometric pressures (e.g., the reference barometric pressure and the second measured barometric pressure) may be used as part of the Hypsometric equation to determine the altitude.

As an example, UE 102 may first take a first order derivative of a function that represents a set of measured barometric pressures that are measured over time. The set of measured barometric pressures may include the base measured barometric pressure that corresponds to the second geographic location and a particular measured barometric pressure that corresponds to a particular geographic location of the device within the structure. Additionally, UE 102 may determine that the device is moving to a new floor based on the first order derivative of the function that represents the set of measured barometric pressures.

Continuing with the example, if the function of the set of measured barometric pressures is represented graphically, UE 102 may select, as a new base measured barometric pressure, a particular measured barometric pressure that corresponds to an endpoint of a peak or a trough in a graphical representation of the set of measured barometric pressures. This may allow UE 102 to use the Hypsometric equation to determine an altitude, that corresponds to the particular geographic location, based on the new base measured barometric pressure and a particular adjusted measured barometric pressure for the particular geographic location. By using the first order derivative to determine the altitude, UE 102 determines the altitude in a manner that accounts for sensor bias or skew caused by the barometric pressure sensor of the device, conserves resources (e.g., processing resources, network resources, and/or the like) of UE 102 and/or other devices relative to using the reference barometric pressures to determine the altitude, and/or the like.

Additionally, or alternatively, UE 102 may determine a particular altitude, that corresponds to a particular geographic location of the device, in a manner that accounts for a difference in temperature outside of the structure and inside of the structure (e.g., as may be caused by an HVAC system of the structure). For example, UE 102 may determine the third altitude for the third geographic location in a manner that accounts for temperature changes caused by the HVAC system of the structure. In this case, UE 102 may take a first order derivative of a function of a set of measured barometric pressures, where the set of measured barometric pressures include the base measured barometric pressure for the first geographic location the second measured barometric pressure for the third geographic location. Additionally, UE 102 may determine a measured pressure difference between the base measured barometric pressure at the first geographic location and the second measured barometric pressure at the second geographic location. This may allow UE 102 to determine the adjusted measured barometric pressure in a manner that accounts for the measured pressure difference. UE 102 may then use the adjusted measured barometric pressure that accounts for the measured pressure difference when determining the third altitude.

In this way, UE 102 determines the third altitude for the third geographic location.

Figure 1E:
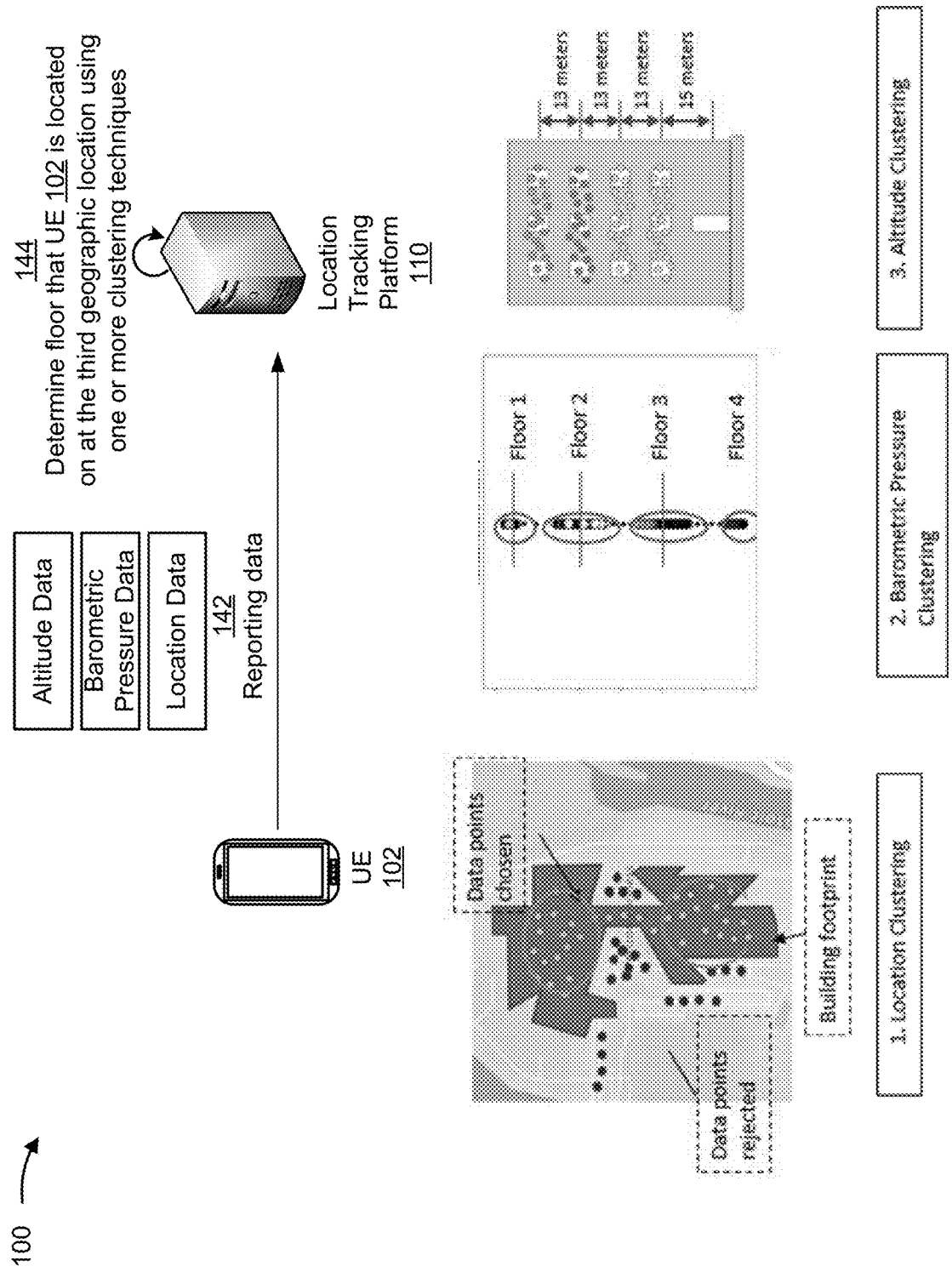

As shown in FIG. 1E, and by reference number 142, UE 102 may provide, to location tracking platform 110, reporting data that includes determined geographic locations, barometric pressures, and altitudes. For example, UE 102 may provide reporting data to location tracking platform 110 using the sixth communication interface (e.g., the sixth API). The reporting data may include particular location data that identifies one or more geographic locations described herein (e.g., the first, second, and/or third geographic location), particular barometric pressure data that identifies one or more barometric pressures described herein (e.g., one or more of the reference barometric pressures, one or more of the measured barometric pressures, the adjusted measured barometric pressure, and/or the like), altitude data that identifies one or more altitudes described herein (e.g., the first, second, and/or third altitudes, differences between two or more altitudes, and/or the like), and/or the like.

In some implementations, UE 102 may periodically provide reporting data to location tracking platform 110. For example, UE 102 may provide reporting data to location tracking platform 110 after each altitude determined by the device. In this case, UE 102 may provide location tracking platform 110 with reporting data that includes the location data that identifies the third geographic location, the altitude data that identifies the third altitude for the third geographic location, and/or additional altitude data that identifies a change in altitude (e.g., between the second altitude and the third altitude).

In some implementations, UE 102 (and/or location tracking platform 110) may cause the reporting data to be stored using a data structure associated with active user data storage device 112. For example, UE 102 may use the third communication interface (e.g., the third API) to provide the reporting data to active user data storage device 112.

As shown by reference number 144, location tracking platform 110 may determine a floor that UE 102 is located on at the third geographic location using one or more clustering techniques. For example, location tracking platform 110 may have access to a third data model that has been trained on historical data using one or more machine learning techniques, such as one or more clustering techniques, one or more regression techniques, one or more classification techniques, and/or the like. The third data model may be configured to predict the floor that UE 102 is located on at a given geographic location based on particular reporting data provided by UE 102. The historical data may include historical location data, historical pressure data, historical altitude data, historical sensor data (e.g., historical signal strength data, historical magnetometer data, and/or the like), additional historical data obtained from other databases (e.g., which may be different data than the historical data collected for the specific purpose of performing one or more implementations described herein), and/or the like.

In some implementations, location tracking platform 110 (or another device) may have trained the third data model by using one or more clustering techniques to process historical location verification data, historical reporting data, and/or the like. The one or more clustering techniques may include a location-based clustering technique, a barometric-pressure-based clustering technique, an altitude-based clustering technique, and/or the like. For example, some structures may have an architecture that includes multiple wings or towers that have different physical characteristics (e.g., different altitudes, different sized floors, different numbers of floors, and/or the like). Consequently, location tracking platform 110 may train the third data model by using the one or more clustering techniques to identify unique characteristics of particular floors of a structure (e.g., a height of each floor, where floors may have different heights).

In some implementations, location tracking platform 110 may train the third data model, using the location-based clustering technique, to groups data points within distinct areas within a structure (sometimes referred to as location-based clusters). For example, location tracking platform 110 may use the location-based clustering technique to process historical reporting data provided by one or more other UEs 102, such that the third data model may be used to determine a set of location-based clusters.

Additionally, or alternatively, location tracking platform 110 may train the third data model, using the barometric-pressure-based clustering technique, to determine a set of floor-specific clusters (e.g., within each respective location-based cluster). For example, location tracking platform 110 may use the barometric-pressure-based clustering technique to analyze groups of temporally proximal measured barometric pressure values (as reported by the one or more other UEs 102) that correspond to the set of location-based clusters. This may allow location tracking platform 110 to train the third data model to be able to determine a set of floor-specific clusters (e.g., within each respective location-based cluster), thereby allowing location tracking platform 110 to identify, based on the clusters, the group of floors within the structure. In some implementations, location tracking platform 110 may train the third data model to be able to determine a median measured barometric pressure for each respective floor, such that location tracking platform 110 may select the median measured barometric pressure as the representative barometric pressure for that floor.

Additionally, or alternatively, location tracking platform 110 may train the third data model, using the altitude-based clustering technique, to determine precise altitudes (e.g., heights) of each respective floor in the structure. For example, location tracking platform 110 may use the altitude-based clustering technique to analyze the set of floor-specific clusters output by the barometric-pressure-based clustering technique to determine precise altitudes (e.g., heights) of each respective floor in the structure. This clustering technique analyzes data collected from all UEs 102 in the structure. This may allow location tracking platform 110 to train the third data model in a manner that is able to determine the precise altitudes of each respective floor in the structure. In some implementations, location tracking platform 110 may determine a median altitude for each additional cluster group and may determine each respective floor height based on the median altitude. In some implementations, location tracking platform 110 may further augment altitudes of the respective floors based on selected GPS altitude values. For example, GPS altitude values that have a vertical accuracy that satisfies a threshold level of accuracy may be normalized to a ground level altitude and may be added to a floor height dataset.

In some implementations, location tracking platform 110 may train the third data model using a maximum-fit density clustering technique, such as a technique using a density-based spatial clustering of applications with noise (DBSCAN). For example, location tracking platform 110 may analyze the historical data using a DBSCAN that reduces a clustering radius by a configurable amount, while still ensuring that a threshold number of datapoints are included in a particular cluster. As an example, if floors of a structure are often less three meters in height, location tracking platform 110 may set a cluster radius of two and a half meters to ensure that particular clusters do not include data points associated with multiple floors, while also ensuring that the particular cluster captures a sufficient number of data points. In some cases, location tracking platform 110 may use the maximum-fit density clustering technique to generate structure-specific floor levels.

To use the third data model, location tracking platform 110 may provide, as input to the third data model, the reporting data from UE 102 and/or other reporting data provided by the one or more other UEs 102 that are inside of the structure with UE 102. This may cause location tracking platform 110 to generate a set of location-based clusters within the structure by using the location-based clustering technique to process the reporting data provided by UE 102 and other reporting data provided by one or more other UEs 102 that are inside of the structure. In the example shown in FIG. 1E, location tracking platform 110 may generate two location-based clusters (e.g., a first location-based cluster associated with a north tower of the structure and a second location-based cluster associated with a south tower of the structure).

Next, location tracking platform 110 may use the barometric-pressure-based clustering technique of the third data model to determine one or more sets of floor-specific clusters. In the example shown, location tracking platform 110 may determine a first set of floor-specific clusters that corresponds to a first location-based cluster, and a second set of floor-specific clusters that corresponds to a second location-based cluster. In this example, each floor-specific cluster may include four floor-specific clusters. Furthermore, location tracking platform 110 may use the altitude-based clustering technique to process the sets of floor-specific clusters. This may allow location tracking platform 110 to determine specific altitude values for each floor associated with a floor-specific cluster of data points. To determine the floor that UE 102 is on, location tracking platform 110 (e.g., using the third data model) may determine which location-based cluster UE 102 is part of and may determine which floor UE 102 is located on at the third geographic location (e.g., by comparing the determined dimensions of each respective floor with the location data and the altitude data that identify a current location of UE 102.

To provide another example, location tracking platform 110 may use the third data model that has been trained using the max-fit density clustering technique. In this example, location tracking platform 110 may use a configurable time-based sliding window approach to select a subset of data points (e.g., 30 minutes, 45 minutes, and/or the like). Additionally, location tracking platform 110 may use the location-based clustering technique to identify a set of location-based clusters and may use the barometric-pressure-based clustering technique to identify a set of pressure-based clusters. Furthermore, location tracking platform 110 may determine one or more floor height values (and/or one or more mean floor height values) and may map the one or more mean floor height values (and/or the one or more mean floor height values) to a new X-Y data space (defined further herein). Next, location tracking platform 110 may determine, for the new X-Y data space, a geographic center of each of the pressure-based clusters. Additionally, location tracking platform 110 may use the location-based clustering technique on the new X-Y data space to generate one or more X-Y data groups for the structure. For each X-Y data group, location tracking platform 110 may determine precise floor heights by using the altitude clustering technique to process values included in the X-Y data group.

In some implementations, location tracking platform 110 may utilize confidence scores that indicate an accuracy of floor heights that were determined by the third data model. For example, location tracking platform 110 may determine a confidence score for each floor altitude based on a set of confidence score factors. The set of confidence score factors may include a first factor that identifies an X-Y cluster size (e.g., where X corresponds to a longitudinal coordinate and Y corresponds to a latitudinal coordinate), a second factor that identifies a unique device count, a third factor that identifies a level of quality of one or more sensors of devices in the structure, a fourth factor that identifies a standard deviation of a floor height, and/or the like.

As an example, location tracking platform 110 may determine one or more X-Y clusters based on data points determined from the barometric pressure clustering technique (which are mapped to data points determined from the altitude clustering technique). In this example, location tracking platform 110 may determine, for each X-Y cluster, a ratio that indicates a percentage of the total structure footprint dataset that is identified by the X-Y cluster. A larger X-Y ratio may correspond to a larger confidence score.

Additionally, or alternatively, and provided as another example, location tracking platform 110 may determine unique device counts for each respective floor of the structure. A larger number of unique devices contributing to a particular floor calculation may correspond to a higher confidence score for a particular height of that floor. Additionally, or alternatively, and provided as another example, location tracking platform 110 may maintain a list of devices that identifies levels of quality of sensors associated with those devices. For example, certain sensors may be regularly tested and/or known to be more accurate (relative to other sensors). Consequently, location tracking platform 110 may assign a higher confidence score to devices that are known to be of a threshold level of quality. Additionally, or alternatively, and provided as another example, location tracking platform 110 may determine a standard deviation of the floor heights and may assign one or more confidence scores based on the standard deviation. If particular floor heights are more than two times the standard deviation, location tracking platform 110 may assign lower confidence scores. This may improve accuracy of floor height determination in situations where an insufficient number of data points are available.

Additionally, location tracking platform 110 may determine an overall confidence score for a floor based on the set of confidence scores. In some implementations, location tracking platform 110 may provide data that identifies heights of floors and corresponding overall confidence scores for display via an interface. In some implementations, location tracking platform 110 may use the overall confidence scores as a filter to select a particular determined floor height and/or standard deviation of the floor height.

In some implementations, location tracking platform 110 may improve accuracy of floor height determinations by utilizing a mean floor height. For example, when a UE 102 is on a floor for the first time, an altitude of the UE 102 may not match any floor heights determined from the one or more clustering techniques. Consequently, location tracking platform 110 may execute a mean function on selected outputs of the altitude clustering technique to determine a mean floor height for the structure. In this case, location tracking platform 110 may use the mean floor height as a floor height in situations where there is an insufficient number of data points to determine the floor height accurately.

In some situations, such as when no data points are available for a top-most floor of the structure, location tracking platform 110 may use machine learning and/or natural language processing to derive an accurate total number of floors of the structure. For example, location tracking platform 110 may make an API call to reference a database that stores mailing addresses (e.g., Pitney-Bowes). In this case, location tracking platform 110 may obtain mailing address data from the database and may use natural language processing and/or machine learning to process the mailing address data to determine a total number of floors of the structure. If data points are not available for one or more identified floors, location tracking platform 110 may use the mean floor height for those floors. In some implementations, such as when barometric pressure data is unavailable, location tracking platform 110 may use publicly available zoning information to determine a mean floor height for the structure.

In some implementations, location tracking platform 110 may label each respective floor relative to a ground altitude level. For example, location tracking platform 110 may obtain a ground level altitude value, that identifies a ground level of the structure, by making an API call to a database (e.g., a database associated with the United States Geological Survey (USGS)). In this case, location tracking platform 110 may compare the ground level altitude value with floor height values for each respective floor. The location tracking platform 110 may then label each floor based on the comparison.

In some implementations, location tracking platform 110 may determine that UE 102 is located on the same floor as another UE 102, where UE 102 entered the structure from a first entrance that is found on a basement floor of the structure, and the other UE 102 entered the structure from a second entrance that is found on a ground floor of the structure. For example, UE 102 may use the second altitude for the second geographic location (e.g., which may correspond to the first entrance) as a ground level altitude. Additionally, UE 102 may determine an absolute altitude (e.g., a sea level altitude) by adding the ground level altitude with subsequently determined altitudes that are computed based on adjusted measured barometric pressures (e.g., the third altitude that was computed using the adjusted measured barometric pressure). By determining absolute altitude, location tracking platform 110 may be able to map the floor that UE 102 is located on with other UEs 102 that used different entrance points of the structure.

In this way, UE 102 provides location tracking platform 110 with reporting data that may be used to determine the floor that UE 102 is located on at the third geographic location.

Figure 1F:
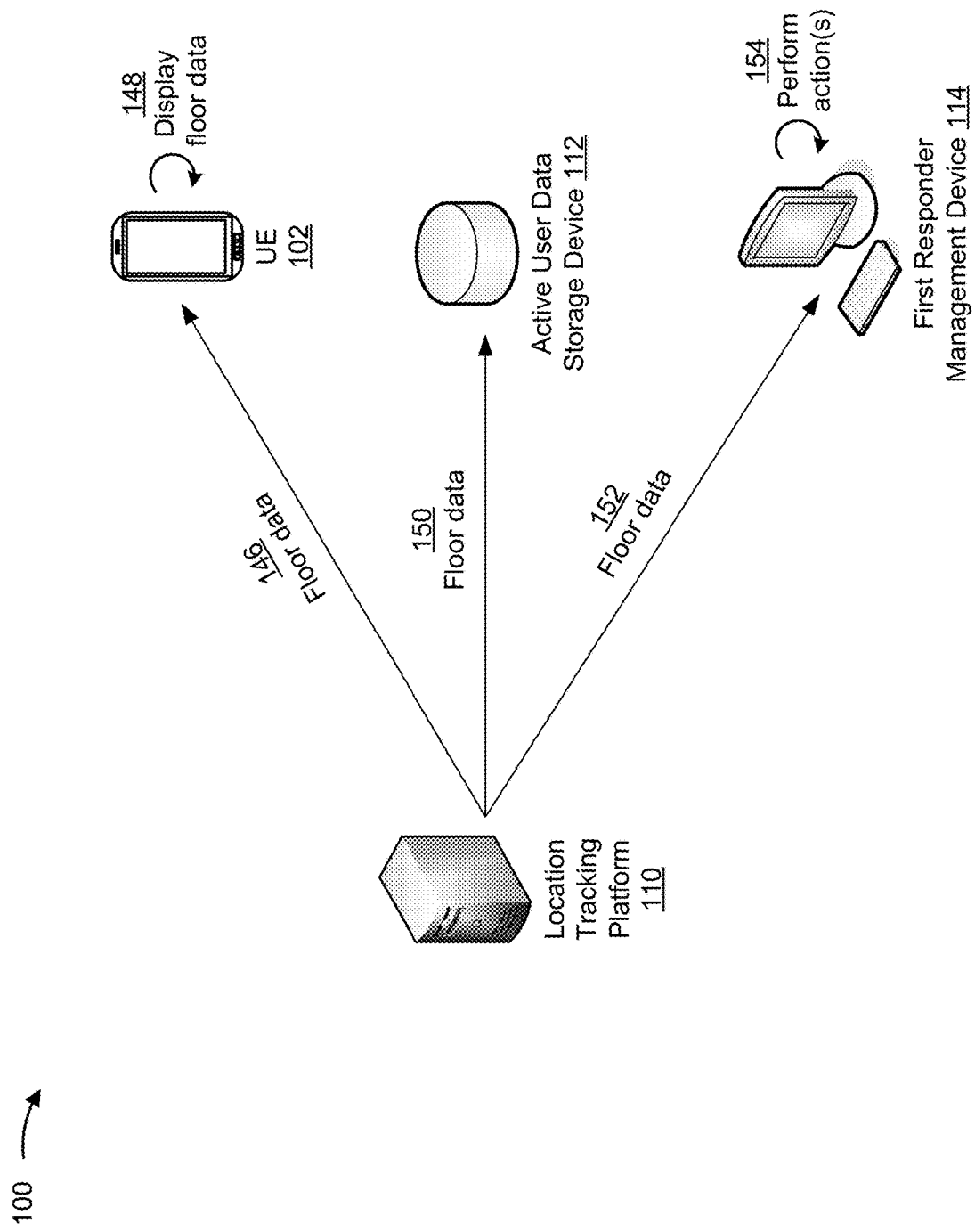

As shown in FIG. 1F, and by reference number 146, location tracking platform 110 may provide UE 102 with floor data that identifies the floor that UE 102 is located on at the third geographic location. For example, location tracking platform may provide UE 102 with the floor data using the third communication interface (e.g., the third API). As shown by reference number 148, UE 102 may display the floor data via a user interface. For example, UE 102 may display the floor data as a feature of the location management application.

As shown by reference number 150, location tracking platform 110 may provide, using the third communication interface (e.g., the third API), the floor data to active user data storage device 112. As shown by reference number 152, location tracking platform 110 may provide the floor data to first responder management device 114. For example, location tracking platform 110 may provide the floor data to first responder management device 114 using a seventh communication interface (e.g., a seventh API).

As shown by reference number 154, first responder management device 114 may perform one or more actions based on receiving the floor data. For example, first responder management device 114 may relay the floor data to other UEs 102 that are associated with other first responders. Additionally, or alternatively, first responder management device 114 may generate and provide directions to UE 102, that other first responders may use to assist in a rescue operation, and may provide data that identifies the directions to particular UEs associated with the other first responders.

Additionally, or alternatively, one or more implementations described herein may be used for a number of other types of services, such as services associated with assisting a law enforcement team, navigation services inside particular structures (e.g., a mall, an airport, a hotel, and/or the like), floor identification for installation of new network equipment, such as antennas for a fifth generation (5G) network, uses relating to supplementing details databases (e.g., such as databases described herein), and/or the like.

In this way, UE 102 uses the adjusted measured barometric pressure to identify the floor that UE 102 is located on at the third geographic location.

As indicated above, FIGS. 1A-1F are provided as one or more examples. Other examples can differ from what is described with regard to FIGS. 1A-1F.

Figure 2:
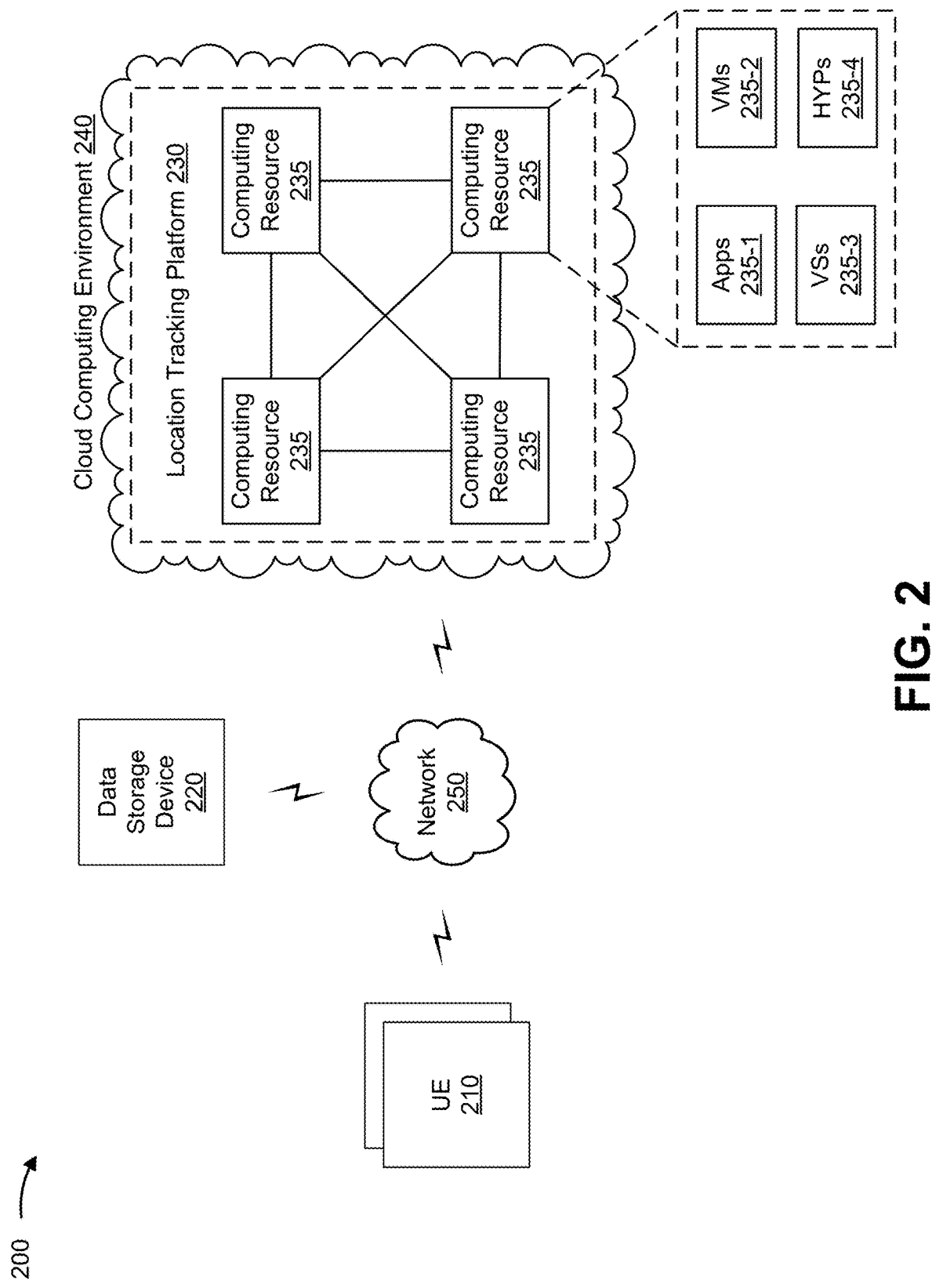
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user equipment (UE) 210, a data storage device 220, a location tracking platform 230 hosted within a cloud computing environment 240, and/or a network 250. Devices of environment 200 may interconnect via wired connections, wireless connections, or a combination of wired and wireless connections.

UE 210 includes one or more devices capable of receiving, storing, processing, and/or providing information, such as information described herein. For example, UE 210 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, an Internet of Things (IoT) device (e.g., a smart appliance, a smart light, a connected vehicle, and/or the like), and/or a similar device.

In some implementations, UE 210 may include one or more sensors, such as a camera (e.g., a body camera), a motion sensor (e.g., an accelerometer), a location tracking sensor, a barometric pressure sensor, a magnetometer, a light sensor, a speed sensor, and/or another type of sensor. In some implementations, the location management application of UE 210 may communicate with the one or more sensors (e.g., to cause the one or more sensors to collect and/or report sensor data described herein). In some implementations, UE 210 may host, support, and/or access a location management application. In some implementations, UE 210 may use one or more communication interfaces (described elsewhere herein) to communicate with data storage device 220 and/or location tracking platform 230.

Data storage device 220 includes one or more devices capable of receiving, storing, processing, and/or providing information, such as information described here. For example, data storage device 220 may include a server device or a group of server devices. In some implementations, a first data storage device 220 may store altitude data in association with particular geographic locations (e.g., particular sets of geographic coordinates). In some implementations, the first data storage device 220 may use a first communication interface (e.g., a first application programming interface (API)) to provide the altitude data to UE 210.

In some implementations, a second data storage device 220 may store reference geographic information system (GIS) data. In some implementations, the first data storage device may use a second communication interface (e.g., a second application programming interface (API)) to provide the reference GIS data to UE 210. In some implementations, a third data storage device 220 may store wireless access point data. In some implementations, the third data storage device 220 may use a third communication interface (e.g., a first application programming interface (API)) to provide the altitude data to UE 210.

In some implementations, a fourth data storage device 220 may store reporting data, reference location data, reference altitude data, reference floor data, and/or the like. For example, the fourth data storage device may use a fourth communication interface (e.g., a fourth API) to provide the reporting data, the reference location data, the reference altitude data, the reference floor data, and/or the like, to UE 210.

Location tracking platform 230 includes one or more devices capable of receiving, storing, generating, determining, and/or providing information, such as information described herein. For example, location tracking platform 230 may include a server device (e.g., a host server, a web server, an application server, etc.), a data center device, or a similar device. In some implementations, location tracking platform 230 may communicate with UE 210 using a fifth communication interface (e.g., a fifth API). In some implementations, location tracking platform 230 may receive reporting data from UE 210 (e.g., via the fifth communication interface). In some implementations, location tracking platform 230 may provide floor data to UE 210, to the fourth data storage device 220, to a device associated with a team of first responders (e.g., using a sixth communication interface, such as a sixth API), and/or the like.

In some implementations, location tracking platform 230 may be configured with a location tracking module that allows one or more UEs 210 to report location information (e.g., that identifies geographic locations for the one or more UEs 210). In some implementations, location tracking platform 230 may be configured with a supplemental location information module. For example, supplemental location information relating to a building footprint, a floorplan, and/or the like, may be stored via a data structure and location tracking platform 230 may use the location information module to reference the data structure and to provide one or more UEs 210 with supplemental location information.

In some implementations, location tracking platform 230 may perform one or more computations/determinations that are described as being performed by UE 210. In this case, location tracking platform 230 may be provided with a set of input data that includes sensor data, location data, barometric pressure data, and/or the like. Additionally, location tracking platform 230 may process the input data to perform the one or more computations/determinations that are described as being performed by UE 210. In this way, location tracking platform 230 reduces a utilization of computing resources of UE 210.

In some implementations, as shown, location tracking platform 230 may be hosted in cloud computing environment 240. Notably, while implementations described herein describe location tracking platform 230 as being hosted in cloud computing environment 240, in some implementations, location tracking platform 230 might not be cloud-based (i.e., may be implemented outside of a cloud computing environment) or may be partially cloud-based.

Cloud computing environment 240 includes an environment that hosts location tracking platform 230. Cloud computing environment 240 may provide computation, software, data access, storage, etc. services that do not require end-user knowledge of a physical location and configuration of system(s) and/or device(s) that hosts location tracking platform 230. As shown, cloud computing environment 240 may include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 may host location tracking platform 230. The cloud resources may include compute instances executing in computing resource 235, storage devices provided in computing resource 235, data transfer devices provided by computing resource 235, and/or the like. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 may include one or more software applications that may be provided to or accessed by UE 210 and/or data storage device 220. Application 235-1 may eliminate a need to install and execute the software applications on these devices. For example, application 235-1 may include software associated with location tracking platform 230 and/or any other software capable of being provided via cloud computing environment 240. In some implementations, one application 235-1 may send/receive information to/from one or more other applications 235-1, via virtual machine 235-2.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of another device (e.g., UE 210 and/or data storage device 220), and may manage infrastructure of cloud computing environment 240, such as data management, synchronization, or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

Network 250 includes one or more wired and/or wireless networks. For example, network 250 may include a cellular network (e.g., a 5G network, a 4G network, such as an LTE network, a 3G network, a code division multiple access (CDMA) network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
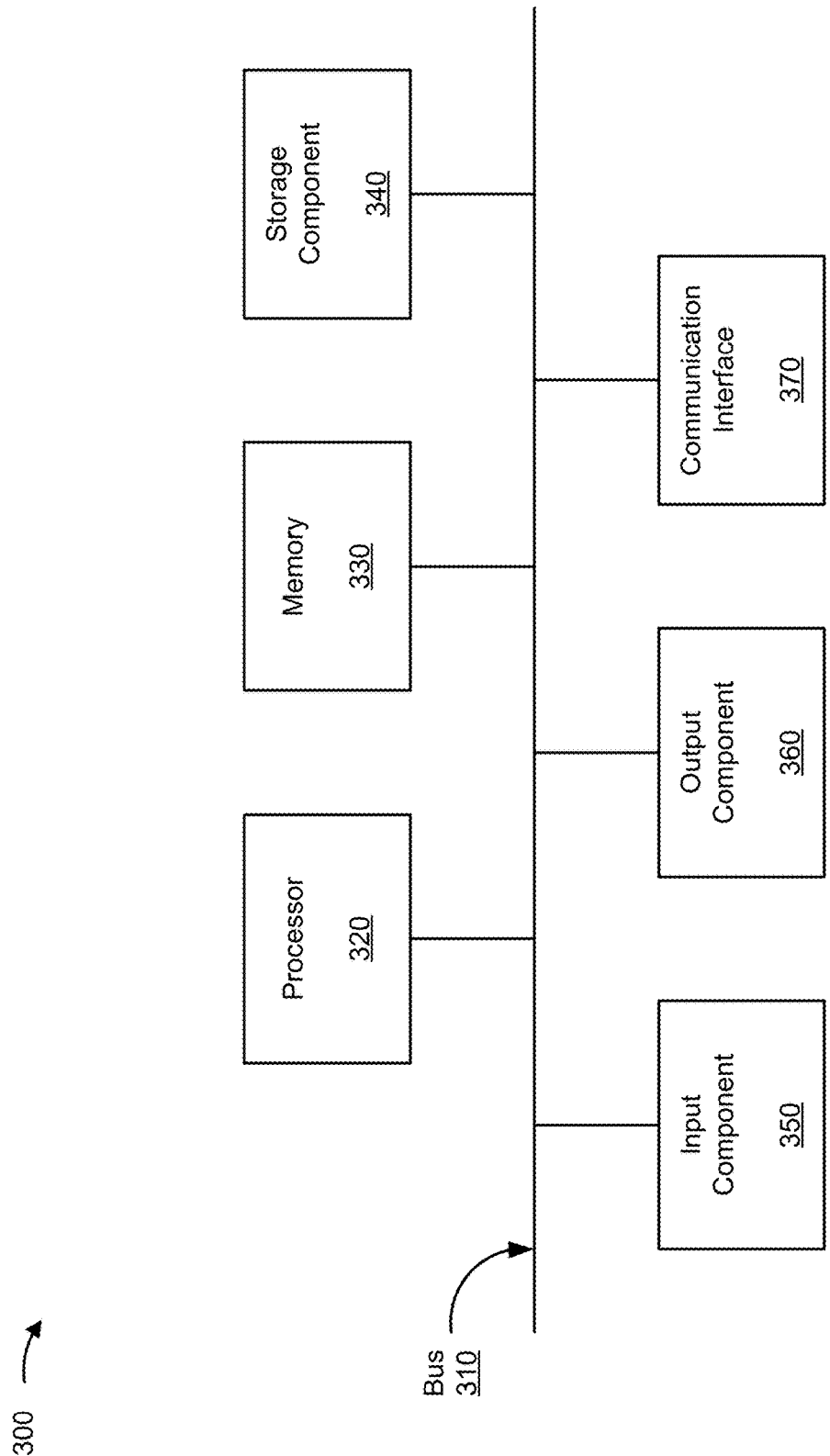
FIG. 3 is a diagram of example components of one or more devices of FIG. 2.

FIG. 3 is a diagram of example components of a device 300. Device 300 may correspond to UE 210, data storage device 220, and/or data storage device 230. In some implementations, UE 210, data storage device 220, and/or data storage device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370, includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370, may permit device 300 to receive information from another device and/or provide information to another device. For example, communication interface 370, may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
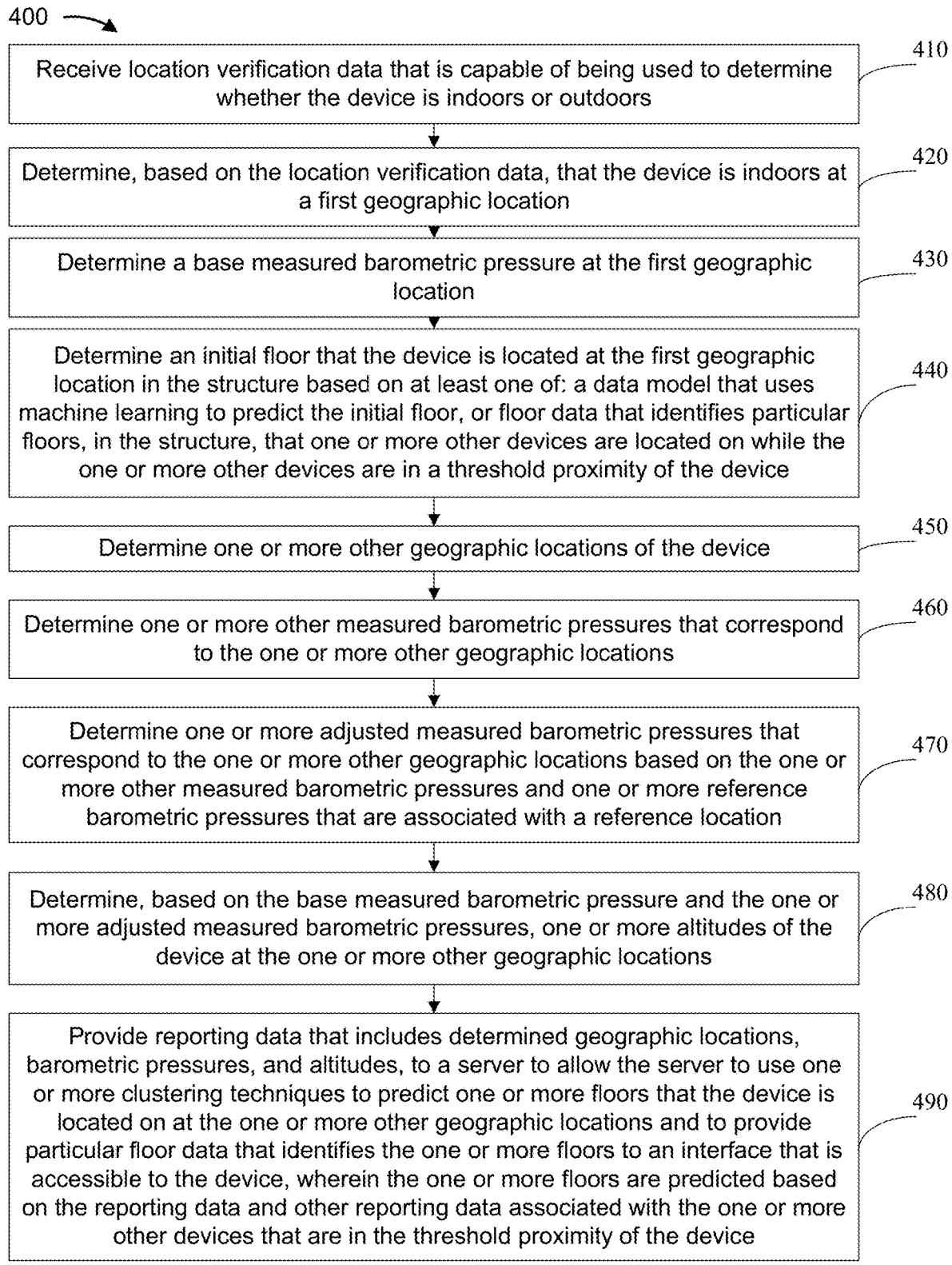
FIG. 4 is a flowchart of an example process for determining one or more adjusted measured barometric pressures and using the one or more adjusted measured barometric pressures to identify one or more floors that a device is located on within a structure.

FIG. 4 is a flow chart of an example process 400 for systems and methods for determining one or more adjusted measured barometric pressures and using the one or more adjusted measured barometric pressures to identify one or more floors that a device is located on within a structure. In some implementations, one or more process blocks of FIG. 4 may be performed by a device (e.g., a user equipment (UE), such as UE 210). In some implementations, one or more process blocks of FIG. 4 may be performed by another device or a group of devices separate from or including the device, such as a group of data storage devices (e.g., a group of data storage devices 220), a location tracking platform (e.g., location tracking platform 230), and/or the like.

As shown in FIG. 4, process 400 may include receiving location verification data that is capable of being used to determine whether the device is indoors or outdoors (block 410). For example, the device (e.g., using processor 320, memory 330, storage component 340, input component 350, communication interface 370, and/or the like) may receive location verification data that is capable of being used to determine whether the device is indoors or outdoors, as described above.

In some implementations, the location verification data may include location data that identifies the first geographic location, signal strength data that identifies a signal strength of the device at the first geographic location, and magnetometer data that identifies a magnetism reading at the first geographic location.

In some implementations, the location verification data may be a second set of location verification data. In this case, the device may receive a first set of location verification data that includes location data that identifies the first geographic location, and geographic information systems (GIS) data that identifies geographic locations of a set of structures and landmarks in a particular geographic region. Additionally, the device may determine, before receiving the second set of location verification data, that the device is outdoors at a particular geographic location based on the location data and the GIS data.

In some implementations, location verification data may be a second set of location verification data. In this case, before receiving the second set of location verification data, the device may receive a first set of location verification data that is capable of being used to determine whether the device is indoors or outdoors. Additionally, the device may, based on the first set of location verification data, determine that the device is outdoors at a particular geographic location. In some implementations, the first set of location verification data may include location data that identifies the first geographic location, and geographic information systems (GIS) data that identifies geographic locations of a set of structures and landmarks in a particular geographic region. In this case, the device may determine that the device is outdoors at a particular geographic location based on the location data and the GIS data.

In some implementations, the device may include a first sensor to determine location, a second sensor to determine signal strength, and a third sensor to determine magnetism. In some implementations, processor 320 of the device may receive, from the first sensor, location data that identifies the second geographic location. Additionally, processor 320 of the device may receive, from the second sensor, signal strength data that identifies a signal strength of the device at the second geographic location. Additionally, processor 320 of the device may receive, from the third sensor, magnetometer data that identifies a magnetism reading at the second geographic location.

As further shown in FIG. 4, process 400 may include determining, based on the location verification data, that the device is indoors at a first geographic location (block 420). For example, the device (e.g., using processor 320, memory 330, storage component 340, input component 350, output component 360, communication interface 370, and/or the like) may determine, based on the location verification data, that the device is indoors at a first geographic location, as described above.

In some implementations, when determining that the device is indoors at the first geographic location, the device may provide the location verification data as input to another data model that has been trained using machine learning to cause the other data model to output a location score that indicates a likelihood of the device being indoors at the first geographic location. In this case, the device may determine that the device is indoors at the first geographic location based on the location score.

In some implementations, the device may determine that the device is indoors at the second geographic location based on the location data, the signal strength data, and the magnetometer data. In some implementations, when determining that the device is indoors at the second geographic location, the device may execute a set of location verification techniques to process the second set of location verification data. This may allow the device to determine that the device is inside of a structure at the second geographic location based on two or more location verification techniques, of the set of location verification techniques, outputting values that are indicative of the device being indoors at the second geographic location.

As further shown in FIG. 4, process 400 may include determining a base measured barometric pressure at the first geographic location (block 430). For example, the device (e.g., using processor 320, memory 330, storage component 340, input component 350, output component 360, communication interface 370, and/or the like) may determine a base measured barometric pressure at the first geographic location, as described above.

As further shown in FIG. 4, process 400 may include determining an initial floor that the device is located on at the first geographic location in a structure based on at least one of: a data model that uses machine learning to predict the initial floor, or floor data that identifies particular floors, in the structure, that one or more other devices are located on while the one or more other devices are in a threshold proximity of the device (block 440). For example, the device (e.g., using processor 320, memory 330, storage component 340, input component 350, output component 360, communication interface 370, and/or the like) may determine an initial floor that the device is located on at the first geographic location in a structure based on at least one of: a data model that uses machine learning to predict the initial floor, or floor data that identifies particular floors, in the structure, that one or more other devices are located on while the one or more other devices are in a threshold proximity of the device, as described above.

As further shown in FIG. 4, process 400 may include determining one or more other geographic locations of the device (block 450). For example, the device (e.g., using processor 320, memory 330, storage component 340, input component 350, output component 360, communication interface 370, and/or the like) may determine one or more other geographic locations of the device, as described above.

As further shown in FIG. 4, process 400 may include determining one or more other measured barometric pressures that correspond to the one or more other geographic locations (block 460). For example, the device (e.g., using processor 320, memory 330, storage component 340, input component 350, output component 360, communication interface 370, and/or the like) may determine one or more other measured barometric pressures that correspond to the one or more other geographic locations, as described above.

As further shown in FIG. 4, process 400 may include determining one or more adjusted measured barometric pressures that correspond to the one or more other geographic locations based on the one or more other measured barometric pressures, and one or more reference barometric pressures that are associated with a reference location (block 470). For example, the device (e.g., using processor 320, memory 330, storage component 340, input component 350, output component 360, communication interface 370, and/or the like) may determine one or more adjusted measured barometric pressures that correspond to the one or more other geographic locations based on the one or more other measured barometric pressures, and one or more reference barometric pressures that are associated with a reference location, as described above.

In some implementations, when determining the one or more adjusted measured barometric pressures, the device may determine a difference between a first reference barometric pressure of the reference location, that is measured after the device determines the first geographic location, and a second reference barometric pressure of the reference location, that is measured after the device determines a second measured barometric pressure at a second geographic location. Additionally, the device may determine an adjusted measured barometric pressure, of the one or more adjusted measured barometric pressures, for a particular geographic location, of the one or more other geographic locations, based on the second measured barometric pressure and the difference between the first reference barometric pressure and the second reference barometric pressure.

In some implementations, the device may take a first order derivative of a function of a set of measured barometric pressures that include a particular measured barometric pressure that corresponds to the particular geographic location and the base measured barometric pressure that corresponds to the first geographic location. Additionally, the device may determine a measured pressure difference between the particular measured barometric pressure at the particular geographic location and the base measured barometric pressure at the first geographic location. Additionally, when determining the one or more adjusted measured barometric pressures, the device may update the one or more adjusted measured barometric pressures to account for the measured pressure difference.

As further shown in FIG. 4, process 400 may include determining, based on the base measured barometric pressure and the one or more adjusted measured barometric pressures, one or more altitudes of the device at the one or more other geographic locations (block 480). For example, the device (e.g., using processor 320, memory 330, storage component 340, input component 350, output component 360, communication interface 370, and/or the like) may determine, based on the base measured barometric pressure and the one or more adjusted measured barometric pressures, one or more altitudes of the device at the one or more other geographic locations, as described above.

In some implementations, the device may determine an altitude for the second geographic location based on the base measured barometric pressure and the adjusted measured barometric pressure. In some implementations, the one or more altitudes may be determined by using a hypsometric formula to process the base measured barometric pressure and the one or more adjusted measured barometric pressures.

In some implementations, the device may determine, based on a first order derivative of a function of the one or more other measured barometric pressures, that the device is moving to a new floor. Additionally, the device may select, as a new base measured barometric pressure, a particular measured barometric pressure, of the one or more other measured barometric pressures, that corresponds to an endpoint of a peak or a trough in a graphical representation of the one or more other measured barometric pressures. Additionally, the device may determine an altitude for a second geographic location based on the new base measured barometric pressure and an adjusted measured barometric pressure, of the one or more adjusted measured barometric pressures, that corresponds to the second geographic location.

As further shown in FIG. 4, process 400 may include providing reporting data that includes determined geographic locations, barometric pressures, and altitudes, to a server to allow the server to use one or more clustering techniques to predict one or more floors that the device is located on at the one or more other geographic locations, and to provide particular floor data that identifies the one or more floors to an interface that is accessible to the device, wherein the one or more floors are predicted based on the reporting data and other reporting data associated with the one or more other devices that are in the threshold proximity of the device (block 490). For example, the device (e.g., using processor 320, memory 330, storage component 340, output component 360, communication interface 370, and/or the like) may provide reporting data that includes determined geographic locations, barometric pressures, and altitudes, to a server to allow the server to use one or more clustering techniques to predict one or more floors that the device is located on at the one or more other geographic locations and to provide particular floor data that identifies the one or more floors to an interface that is accessible to the device, as described above. In some implementations, the one or more floors may be predicted based on the reporting data and other reporting data associated with the one or more other devices that are in the threshold proximity of the device.

In some implementations, the device may determine, using reporting data that includes determined geographic locations, barometric pressures, and altitudes, one or more floors that the device is located on at the one or more other geographic locations. In this case, the one or more floors may be determined based on the reporting data determined by the device and other reporting data associated with one or more other devices that are in a threshold proximity of the device. In some implementations, the device may perform one or more actions based on determining the one or more floors that the device is located on at the one or more other geographic locations.

In some implementations, the device may provide, as part of the reporting data, sensor data that identifies a type of pressure sensor associated with the device. The server device may receive other sensor data corresponding to the one or more other devices, may assign a confidence score to the reporting data based on the sensor data, may assign one or more other confidence scores to the other reporting data based on the other sensor data, may predict the one or more floors that the device is located on based on the confidence score, and may predict one or more other floors that the one or more other devices are located on based on the one or more other confidence scores.

The foregoing disclosure provides illustration and description but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, location verification data that is capable of being used to determine whether the device is indoors or outdoors;
   determining, by the device and based on the location verification data, that the device is indoors at a first geographic location;
   determining, by the device, a base measured barometric pressure at the first geographic location;
   determining, by the device, an initial floor that the device is located on at the first geographic location in a structure based on at least one of:
      a data model that uses machine learning to predict the initial floor, or
      floor data that identifies particular floors, in the structure, that one or more other devices are located on while the one or more other devices are in a threshold proximity of the device;
   determining, by the device, one or more other geographic locations of the device;
   determining, by the device, one or more other measured barometric pressures that correspond to the one or more other geographic locations;
   determining, by the device, one or more adjusted measured barometric pressures that correspond to the one or more other geographic locations based on the one or more other measured barometric pressures and one or more reference barometric pressures that are associated with a reference location;
   determining, by the device and based on the base measured barometric pressure and the one or more adjusted measured barometric pressures, one or more altitudes of the device at the one or more other geographic locations; and
   providing, by the device, reporting data that includes the one or more other geographic locations, barometric pressures, and the one or more altitudes, to a server to allow the server to use one or more clustering techniques to predict one or more floors that the device is located on at the one or more other geographic locations and to provide particular floor data that identifies the one or more floors to an interface that is accessible to the device,
      wherein the one or more floors are predicted based on the reporting data and other reporting data associated with the one or more other devices that are in the threshold proximity of the device.

2. The method of claim 1, wherein the location verification data includes location data that identifies the first geographic location, signal strength data that identifies a signal strength of the device at the first geographic location, and magnetometer data that identifies a magnetism reading at the first geographic location; and
   wherein determining that the device is indoors at the first geographic location comprises:
      providing the location verification data as input to another data model that has been trained using machine learning to cause the other data model to output a location score that indicates a likelihood of the device being indoors at the first geographic location, and
      determining that the device is indoors at the first geographic location based on the location score.

3. The method of claim 1, wherein providing the reporting data comprises:
   providing, as part of the reporting data, sensor data that identifies a type of pressure sensor associated with the device,
      wherein the server receives other sensor data corresponding to the one or more other devices,
      wherein the server assigns a confidence score to the reporting data based on the sensor data,
      wherein the server assigns one or more other confidence scores to the other reporting data based on the other sensor data,
      wherein the server predicts the one or more floors that the device is located on based on the confidence score, and
      wherein the server predicts one or more other floors that the one or more other devices are located on based on the one or more other confidence scores.

4. The method of claim 1, wherein the method further comprises:
   determining, based on a first order derivative of a function of the one or more other measured barometric pressures, that the device is moving to a new floor; and
   selecting, as a new base measured barometric pressure, a particular measured barometric pressure, of the one or more other measured barometric pressures, that corresponds to an endpoint of a peak or a trough in a graphical representation of the function of the one or more other measured barometric pressures; and
   wherein determining the one or more altitudes comprises:
      determining an altitude for a second geographic location based on the new base measured barometric pressure and an adjusted measured barometric pressure, of the one or more adjusted measured barometric pressures, that corresponds to the second geographic location.

5. The method of claim 1, wherein the one or more altitudes are determined by using a hypsometric formula to process the base measured barometric pressure and the one or more adjusted measured barometric pressures.

6. The method of claim 1, wherein the location verification data is a second set of location verification data;

wherein the method further comprises:
receiving a first set of location verification data that includes location data that identifies the first geographic location and geographic information systems (GIS) data that identifies geographic locations of a set of structures and landmarks in a particular geographic region; and
determining, before receiving the second set of location verification data, that the device is outdoors at a particular geographic location based on the location data and the GIS data.

7. The method of claim 6, further comprising:
determining a measured pressure difference between a particular measured barometric pressure at the particular geographic location and the base measured barometric pressure at the first geographic location; and
wherein determining the one or more adjusted measured barometric pressures comprises:
updating the one or more adjusted measured barometric pressures to account for the measured pressure difference.

8. A device, comprising:
one or more memories; and
one or more processors, communicatively coupled to the one or more memories, to:
receive a first set of location verification data that is capable of being used to determine whether the device is indoors or outdoors;
determine, based on the first set of location verification data, that the device is outdoors at a first geographic location;
receive a second set of location verification data that is capable of being used to determine whether the device is indoors or outdoors;
determine, based on the second set of location verification data, that the device is indoors at a second geographic location;
determine a base measured barometric pressure at the second geographic location;
determine one or more other measured barometric pressures that correspond to one or more other geographic locations of the device;
determine one or more adjusted measured barometric pressures that correspond to the one or more other geographic locations based on the one or more other measured barometric pressures and one or more reference barometric pressures that are associated with a reference location;
determine, based on the base measured barometric pressure and the one or more adjusted measured barometric pressures, one or more altitudes of the device at the one or more other geographic locations; and
provide reporting data that includes the one or more other geographic locations, barometric pressures, and the one or more altitudes, to a server to allow the server to use one or more clustering techniques to predict one or more floors that the device is located on at the one or more other geographic locations and to provide floor data that identifies the one or more floors to an interface that is accessible to the device, wherein the one or more floors are predicted based on the reporting data and other reporting data associated with one or more other devices that are in a threshold proximity of the device.

9. The device of claim 8, wherein the first set of location verification data includes location data that identifies the first geographic location and geographic information systems (GIS) data that identifies geographic locations of a set of structures and landmarks in a particular geographic region;
wherein the one or more processors, when determining that the device is outdoors at the first geographic location, are to:
determine that the device is outdoors at a particular geographic location based on the location data and the GIS data.

10. The device of claim 9, wherein the one or more processors are further to:
determine a measured pressure difference between a particular measured barometric pressure at the first geographic location and the base measured barometric pressure at the second geographic location; and
wherein the one or more processors, when determining the one or more adjusted measured barometric pressures, are to:
update the one or more adjusted measured barometric pressures to account for the measured pressure difference.

11. The device of claim 8, further comprising:
a first sensor to determine location,
a second sensor to determine signal strength, and
a third sensor to determine magnetism;
wherein the one or more processors, when receiving the second set of location verification data, are to:
receive, from the first sensor, location data that identifies the second geographic location,
receive, from the second sensor, signal strength data that identifies a signal strength of the device at the second geographic location, and
receive, from the third sensor, magnetometer data that identifies a magnetism reading at the second geographic location; and
wherein the one or more processors, when determining that the device is indoors at the second geographic location, are to:
determine that the device is indoors at the second geographic location based on the location data, the signal strength data, and the magnetometer data.

12. The device of claim 8, wherein the one or more processors, when providing the reporting data, are to:
provide the reporting data to the server to allow the server to:
perform a location-based clustering technique, of the one or more clustering techniques, to group the device and the one or more other devices into one or more location-based clusters,
perform a barometric-pressure-based clustering technique, of the one or more clustering techniques, to group the one or more location-based clusters into sub-clusters based on measured barometric pressures, and
perform an altitude-based clustering technique, of the one or more clustering techniques, to group the sub-clusters into a final cluster group based on altitudes associated with the device and the one or more other devices.

13. The device of claim 8, wherein the one or more processors, when determining the one or more adjusted measured barometric pressures, are to:
determine a difference between a first reference barometric pressure of the reference location, that is measured after the device determines the second geographic location, and a second reference barometric pressure of the reference location that is measured after the device determines a third geographic location of the one or more other geographic locations, and determine an adjusted measured barometric pressure, of the one or more adjusted measured barometric pressures, for a particular geographic location, of the one or more other geographic locations, based on a second measured barometric pressure, of the one or more other measured barometric pressures, and the difference between the first reference barometric pressure and the second reference barometric pressure; and wherein the one or more processors, when determining the one or more altitudes, are to:

determine an altitude for the third geographic location based on the base measured barometric pressure and the adjusted measured barometric pressure.

14. The device of claim 8, wherein the one or more processors are further to:

determine, for the second geographic location, an initial floor that the device is located on in a structure based on at least one of:

a data model that uses machine learning to predict the initial floor, or particular floor data that identifies particular floors that one or more other devices are located on while the one or more other devices are in the threshold proximity of the device.

15. A non-transitory computer-readable medium storing instructions, the instructions comprising:

one or more instructions that, when executed by one or more processors of a device, cause the one or more processors to:

receive location verification data that is capable of being used to determine whether the device is located indoors or outdoors;

determine, based on the location verification data, that the device is indoors at a first geographic location;

determine a base measured barometric pressure at the first geographic location;

determine an initial floor that the device is located on in a structure at the first geographic location;

determine one or more other geographic locations of the device;

determine one or more other measured barometric pressures that correspond to the one or more other geographic locations;

determine one or more adjusted measured barometric pressures that correspond to the one or more other geographic locations based on the one or more other measured barometric pressures and one or more reference barometric pressures that are associated with a reference location;

determine, based on the base measured barometric pressure and the one or more adjusted measured barometric pressures, one or more altitudes of the device at the one or more other geographic locations;

determine, using reporting data that includes the one or more other geographic locations, barometric pressures, and the one or more altitudes, one or more floors that the device is located on at the one or more other geographic locations, wherein the one or more floors are determined based on the reporting data determined by the device and other reporting data associated with one or more other devices that are in a threshold proximity of the device; and perform one or more actions based on determining the one or more floors that the device is located on at the one or more other geographic locations.

16. The non-transitory computer-readable medium of claim 15, wherein the location verification data includes at least one of:

location data that identifies the first geographic location of the device, signal strength data that identifies a signal strength of the device at the first geographic location, magnetometer data that identifies a magnetism reading at the first geographic location, or light data that identifies a level of ambient light at the first geographic location.

17. The non-transitory computer-readable medium of claim 15, wherein the one or more instructions, that cause the one or more processors to determine that the device is located indoors at the first geographic location, cause the one or more processors to:

provide the location verification data as input to a data model that has been trained using machine learning to cause the data model to output a location score that indicates a likelihood of the device being located indoors at the first geographic location, and determine that the device is located indoors at the first geographic location based on the location score.

18. The non-transitory computer-readable medium of claim 15, wherein the one or more instructions, that cause the one or more processors to determine that the device is located indoors at the first geographic location, cause the one or more processors to:

execute a set of location verification techniques to process the location verification data, and determine that the first geographic location of the device is inside of the structure based on two or more location verification techniques, of the set of location verification techniques, outputting values that are indicative of the device being located indoors at the first geographic location.

19. The non-transitory computer-readable medium of claim 15, wherein the one or more instructions, that cause the one or more processors to determine the one or more adjusted measured barometric pressures, cause the one or more processors to:

determine a difference between a first reference barometric pressure of the reference location, that is measured after the device determines the first geographic location, and a second reference barometric pressure of the reference location that is measured after the device determines a second geographic location of the one or more other geographic locations, and determine an adjusted measured barometric pressure, of the one or more adjusted measured barometric pressures, for the second geographic location, based on a second measured barometric pressure, that corresponds to the second geographic location, and the difference between the first reference barometric pressure and the second reference barometric pressure; and wherein the one or more instructions, that cause the one or more processors to determine the one or more altitudes, cause the one or more processors to:

determine an altitude for the second geographic location based on the base measured barometric pressure and the adjusted measured barometric pressure.

20. The non-transitory computer-readable medium of claim 15, wherein the one or more instructions, when executed by the one or more processors, further cause the one or more processors to:
 determine, based on a first order derivative of a function of the one or more other measured barometric pressures, that the device is moving to a new floor; and
 select, as a new base measured barometric pressure, a particular measured barometric pressure, of the one or more other measured barometric pressures, that corresponds to an endpoint of a peak or a trough in a graphical representation of the function of the one or more other measured barometric pressures; and
 wherein the one or more instructions, that cause the one or more processors to determine the one or more altitudes, cause the one or more processors to:
  determine an altitude for a second geographic location, of the one or more other geographic locations, based on the new base measured barometric pressure and an adjusted measured barometric pressure, of the one or more adjusted measured barometric pressures, that corresponds to the second geographic location.

\* \* \* \* \*